United States Patent
Chanda et al.

(10) Patent No.: US 10,764,238 B2
(45) Date of Patent: Sep. 1, 2020

(54) PROVIDING SERVICES FOR LOGICAL NETWORKS

(71) Applicant: Nicira, Inc., Palo Alto, CA (US)

(72) Inventors: Anupam Chanda, San Jose, CA (US); Pankaj Thakkar, Cupertino, CA (US); Igor Ganichev, San Jose, CA (US); Ronghua Zhang, San Jose, CA (US); Ansis Atteka, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 254 days.

(21) Appl. No.: 15/886,738

(22) Filed: Feb. 1, 2018

(65) Prior Publication Data

US 2018/0159821 A1    Jun. 7, 2018

Related U.S. Application Data

(62) Division of application No. 14/069,329, filed on Oct. 31, 2013, now Pat. No. 9,887,960.

(Continued)

(51) Int. Cl.
*H04L 29/12* (2006.01)
*H04L 12/713* (2013.01)
(Continued)

(52) U.S. Cl.
CPC ........ *H04L 61/2015* (2013.01); *H04L 45/586* (2013.01); *G06F 2009/45595* (2013.01); *H04L 45/64* (2013.01)

(58) Field of Classification Search
CPC ... H04L 61/2015; H04L 45/586; H04L 45/64; H04L 61/103; G06F 2009/45595; G06F 9/44505; G06F 9/455
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |

(Continued)

FOREIGN PATENT DOCUMENTS

| | | | |
|---|---|---|---|
| CN | 101677291 A | * | 3/2010 |
| CN | 101677291 A | | 3/2010 |

(Continued)

OTHER PUBLICATIONS

Cain, Nigel, "System Center: Virtual Machine Manager Engineering Blog. Networking in VMM 2012 SP1-Logical Networks (Part I)," Feb. 14, 2013, 24 pages, Retrieved from: https://blogs.technet.microsoft.com/scvmm/2013/02/14/netowrking-in-vmm-2012-sp1-logical-networks-part-i/.

(Continued)

*Primary Examiner* — Michael C Lai
(74) *Attorney, Agent, or Firm* — Adeli LLP

(57) ABSTRACT

Some embodiments provide a method for a network controller that manages several logical networks. The method receives a specification of a logical network that includes at least one logical forwarding element attached to a logical service (e.g., DHCP). The method selects at least one host machine to host the specified logical service from several host machines designated for hosting logical services. The method generates logical service configuration information for distribution to the selected host machine. In some embodiments, the method selects a master host machine and a backup host machine for hosting logical service. In some embodiments, a particular one of the designated host machines hosts at least two DHCP services for two different logical networks as separate processes operating on the particular host machine.

21 Claims, 14 Drawing Sheets

Related U.S. Application Data

(60) Provisional application No. 61/866,022, filed on Aug. 14, 2013.

(51) Int. Cl.
*H04L 12/715* (2013.01)
*G06F 9/455* (2018.01)

(56) References Cited

U.S. PATENT DOCUMENTS

| | | |
|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,205,118 B1 | 3/2001 | Rathnavelu |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,152,117 B1 | 12/2006 | Stapp et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,231,660 B1 | 6/2007 | Daude et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,542,468 B1 | 6/2009 | Begley et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,814,541 B1 | 10/2010 | Manvi |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,882,169 B1 | 2/2011 | Droms et al. |
| 7,885,276 B1 | 2/2011 | Lin |
| 7,890,689 B2 | 2/2011 | Lam et al. |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,176,094 B2 * | 5/2012 | Friedman ............ G06F 11/3664 707/803 |
| 8,190,767 B1 | 5/2012 | Maufer et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,549 B2 | 8/2012 | Aura et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,478,902 B1 | 7/2013 | Holland et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,958,298 B2 | 2/2015 | Zhang et al. |
| 9,043,463 B1 * | 5/2015 | Cohn ............... H04L 63/0272 709/225 |
| 9,059,999 B2 | 6/2015 | Koponen et al. |
| 9,887,960 B2 | 2/2018 | Chanda et al. |
| 9,952,885 B2 | 4/2018 | Chanda et al. |
| 9,999,030 B2 | 6/2018 | Gu et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2003/0093481 A1 | 5/2003 | Mitchell et al. |
| 2003/0163341 A1 | 8/2003 | Banerjee |
| 2004/0021678 A1 * | 2/2004 | Ullah ............... G06F 9/5027 715/700 |
| 2004/0073659 A1 | 4/2004 | Rajsic et al. |
| 2004/0078419 A1 | 4/2004 | Ferrari et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0080891 A1 * | 4/2005 | Cauthron ............ G06F 11/2023 709/223 |
| 2005/0083953 A1 | 4/2005 | May |
| 2005/0120160 A1 | 6/2005 | Plouffe et al. |
| 2005/0132044 A1 | 6/2005 | Guingo et al. |
| 2005/0188063 A1 | 8/2005 | Finley, Jr. |
| 2005/0251856 A1 | 11/2005 | Araujo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0161663 A1 | 7/2006 | Palm |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0291388 A1 | 12/2006 | Amdahl et al. |
| 2007/0043860 A1 | 2/2007 | Pabari |
| 2007/0061492 A1 | 3/2007 | van Riel |
| 2007/0064673 A1 | 3/2007 | Bhandaru et al. |
| 2007/0140128 A1 | 6/2007 | Klinker et al. |
| 2007/0156919 A1 | 7/2007 | Potti et al. |
| 2007/0201357 A1 | 8/2007 | Smethurst et al. |
| 2007/0286209 A1 | 12/2007 | Wang et al. |
| 2007/0297428 A1 | 12/2007 | Bose et al. |
| 2008/0002579 A1 | 1/2008 | Lindholm et al. |

(56) References Cited

U.S. PATENT DOCUMENTS

| | | |
|---|---|---|
| 2008/0002683 A1 | 1/2008 | Droux et al. |
| 2008/0013474 A1 | 1/2008 | Nagarajan et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Flecker et al. |
| 2008/0072305 A1 | 3/2008 | Casado et al. |
| 2008/0086726 A1 | 4/2008 | Griffith et al. |
| 2008/0151893 A1 | 6/2008 | Nordmark et al. |
| 2008/0159301 A1 | 7/2008 | de Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0019536 A1 | 1/2009 | Green |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0129271 A1 | 5/2009 | Ramankutty et al. |
| 2009/0132696 A1 | 5/2009 | Cankaya et al. |
| 2009/0150527 A1 | 6/2009 | Tripathi et al. |
| 2009/0161547 A1 | 6/2009 | Riddle et al. |
| 2009/0177953 A1 | 7/2009 | Cau |
| 2009/0235325 A1 | 9/2009 | Dimitrakos et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0282471 A1 | 11/2009 | Green et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2009/0327471 A1 | 12/2009 | Astete et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0299419 A1 | 11/2010 | Ramankutty et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022694 A1 | 1/2011 | Dalal et al. |
| 2011/0022695 A1 | 1/2011 | Dalal et al. |
| 2011/0026537 A1 | 2/2011 | Kolhi et al. |
| 2011/0030032 A1 | 2/2011 | Baykal et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0082879 A1 | 4/2011 | Hazlewood et al. |
| 2011/0085557 A1 | 4/2011 | Gnanasekaram et al. |
| 2011/0085559 A1 | 4/2011 | Chung et al. |
| 2011/0119382 A1* | 5/2011 | Shaw, Jr. ............ G06F 11/3664 709/226 |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0027008 A1 | 2/2012 | Chou |
| 2012/0131643 A1 | 5/2012 | Cheriton |
| 2012/0131662 A1 | 5/2012 | Kuik |
| 2012/0182992 A1 | 7/2012 | Cowart et al. |
| 2012/0197973 A1 | 8/2012 | Tukol et al. |
| 2012/0236734 A1 | 9/2012 | Sampath et al. |
| 2012/0281711 A1 | 11/2012 | Karaoguz et al. |
| 2013/0007740 A1 | 1/2013 | Kikuchi et al. |
| 2013/0041987 A1* | 2/2013 | Warno ............... H04L 61/2535 709/220 |
| 2013/0044636 A1 | 2/2013 | Koponen et al. |
| 2013/0044641 A1 | 2/2013 | Koponen et al. |
| 2013/0058229 A1* | 3/2013 | Casado ............... H04L 45/745 370/252 |
| 2013/0058346 A1 | 3/2013 | Sridharan et al. |
| 2013/0058351 A1* | 3/2013 | Casado ................. H04L 47/00 370/400 |
| 2013/0073743 A1 | 3/2013 | Ramasamy et al. |
| 2013/0128891 A1 | 5/2013 | Koponen et al. |
| 2013/0142048 A1 | 6/2013 | Gross et al. |
| 2013/0148505 A1 | 6/2013 | Koponen et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0227550 A1 | 8/2013 | Weinstein et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0294230 A1 | 11/2013 | Popa et al. |
| 2013/0329548 A1 | 12/2013 | Nakil et al. |
| 2013/0332983 A1 | 12/2013 | Koorevaar et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0068602 A1 | 3/2014 | Gember et al. |
| 2014/0075013 A1 | 3/2014 | Agrawal et al. |
| 2014/0115578 A1 | 4/2014 | Cooper et al. |
| 2014/0195666 A1 | 7/2014 | Dumitriu |
| 2015/0016469 A1 | 1/2015 | Ganichev et al. |
| 2015/0052262 A1 | 2/2015 | Chanda et al. |
| 2015/0052522 A1 | 2/2015 | Chanda et al. |
| 2015/0095472 A1 | 4/2015 | Cardona et al. |
| 2015/0103838 A1 | 4/2015 | Zhang et al. |
| 2015/0117445 A1 | 4/2015 | Koponen et al. |
| 2015/0124823 A1 | 5/2015 | Pani et al. |
| 2015/0163196 A1 | 6/2015 | Bhagwat et al. |
| 2015/0381478 A1 | 12/2015 | Zhang et al. |
| 2016/0248729 A1 | 8/2016 | Cui et al. |
| 2016/0352867 A1 | 12/2016 | Subbarayan et al. |
| 2017/0317969 A1 | 11/2017 | Masurekar et al. |
| 2017/0317974 A1 | 11/2017 | Masurekar et al. |

FOREIGN PATENT DOCUMENTS

| | | |
|---|---|---|
| CN | 102710814 A | 10/2012 |
| EP | 1653688 A1 | 5/2006 |
| EP | 2838244 A2 | 2/2015 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |

OTHER PUBLICATIONS

Casado, Martin, et al. "Ethane: Taking Control of the Enterprise," SIGCOMM'07, Aug. 27-31, 2007, 12 pages, ACM, Kyoto, Japan.

Dumitriu, Dan Mihai, et al. (U.S. Appl. No. 61/514,990), "Method and Apparatus for Computing", filed Aug. 4, 2011, 31 pages.

Koponen, Teemu, et al., "Network Virtualization in Multi-tenant Datacenters," Technical Report TR-2013-001E, International Computer Science Institute & UC Berkeley, Aug. 2013, 22 pages, VMware, Inc., Palo Alto, CA, USA.

(56) References Cited

OTHER PUBLICATIONS

Shenker, Scott, et al., "The Future of Networking, and the Past of Protocols," Dec. 2, 2011, 30 pages, USA.

Author Unknown, "What is a Logical Network?," Feb. 2010, 3 pages, retrieved from https://searchnetworking.techtarget.com/definition/logical-network.

* cited by examiner

PROVIDING SERVICES FOR LOGICAL NETWORKS

CLAIM OF BENEFIT TO PRIOR APPLICATIONS

This application is a divisional application of U.S. patent application Ser. No. 14/069,329, filed Oct. 31, 2013, now issued as U.S. Pat. No. 9,887,960. U.S. patent application Ser. No. 14/069,329 claims the benefit of U.S. Provisional Patent Application 61/866,022, filed Aug. 14, 2013. U.S. patent application Ser. No. 14/069,329, now issued as U.S. Pat. No. 9,887,960, 2015/0052262 and U.S. Provisional Patent Application 61/866,022 are incorporated herein by reference.

BACKGROUND

Typical physical networks often use Dynamic Host Configuration Protocol (DHCP) to assign IP addresses to physical machines. When a computer boots up, one of the processes that computer performs is to communicate with one or more DHCP servers to request and receive an IP address. This assignment may be static (a given computer always receives the same IP address based on its MAC address) or dynamic (the DHCP server assigns an IP address from a range of addresses, and a given computer may receive different IP addresses at different times).

In virtualized networks, virtual machines also require IP addresses. With the number of virtual machines that may operate in a multi-tenant data center, having a single DHCP server or even several DHCP servers operating to serve all of the virtualized networks in a data center may not be feasible, especially in the bootstorm case (when numerous VMs are started up at the same time). Thus, methods for providing DHCP service to such virtualized networks are needed.

BRIEF SUMMARY

Some embodiments provide a network control system that enables Dynamic Host Configuration Protocol (DHCP) services for logical networks. Specifically, the network control system of some embodiments enables the provisioning of DHCP services in a centralized manner accessible by all of the machines connected to a logical network. In some embodiments, the network control system provides DHCP services within a service node that is part of the logical network, and which may additionally provide other services (e.g., metadata proxy, DNS, etc.).

In some embodiments, a user (e.g., an administrator) may configure a logical network (e.g., a collection of logical switches, routers, middleboxes, services, etc.) for implementation across a physical network (e.g., numerous host machines in a multi-tenant data center). In some embodiments, the logical network may include logical service nodes, which provide the DHCP services in addition to other services, as mentioned above. The user may configure the logical service nodes to attach to one or more logical switches in the logical network in some embodiments.

The network control system comprises a controller cluster (one or more network controllers, which are hierarchically arranged in some embodiments), which selects one or more host machines on which to implement the logical service node. In some embodiments, the physical network on which the logical networks are implemented includes a set of host machines specifically for hosting the logical service nodes. In some embodiments, each of these host machines may host several logical service nodes, and the controller cluster is responsible for balancing the logical service nodes of various logical networks (e.g., for different tenants) across this set of host machines.

In some embodiments, the network controller cluster selects two host machines from the set to implement each logical service node, with a first host machine acting as a master (or active) implementation and a second host machine acting as a backup (or standby) implementation. Thus, a particular one of the host machines may have the master implementations of several different logical service nodes, the backup implementations of several different logical service nodes, or a combination thereof.

On the host machines, some embodiments implement the logical service nodes in a container that runs on the machine, such as a virtual machine or a namespace. A namespace, in some embodiments, is a lightweight container (less computationally intensive than a virtual machine) that can operate on a host machine. Various processes can run in a namespace. Thus, with each logical service node implemented by a namespace running on a host machine, each of the services provided by that node may run as processes in the namespace. For DHCP service, a DHCP module (e.g., an open source dhcp daemon) runs in the namespace. Each of the namespaces operating on a particular host may have a different instance of the DHCP module operating a DHCP service for a different logical network. As mentioned above, in some embodiments logical switches (logical constructs for performing L2 forwarding based on, e.g., MAC addresses) connect to the logical services node that contains the DHCP service. In some embodiments, multiple logical switches on a network may connect to the same logical services node.

When a user configures a DHCP service for a logical network, the controller cluster of some embodiments generates data tuples that represent the DHCP configuration. In order to specify the DHCP configuration, in some embodiments the user specifies a logical services node, attaches one or more logical switches to the node, provides MAC-to-IP bindings (i.e., for static DHCP) and DHCP options for the machines connected to the logical switch, among other actions. The controller cluster, in addition to specifying one or more host machines on which to implement the service, then transforms this configuration into a set of data tuples that define a namespace, defines a DHCP process for the namespace, defines the logical switch, and defines the DHCP configuration (including the address bindings and options). Some embodiments provide static DHCP, in which the address bindings map each MAC address of the machines connected to the logical switch to a specific IP address. The DHCP options may be global (i.e., for all hosts on all logical switches that use the particular DHCP service), applied to a particular logical switch (i.e., for all hosts on the logical switch), or applied to a specific host.

The controller cluster is responsible for distributing these data tuples to the appropriate host machines (e.g., the master and backup hosts for a particular logical service node). These host machines receive the data tuples and store the tuples as database tables having a particular format. In some embodiments, the data tuples are received in a similar format to data tuples relating to virtual switch configuration on the host machine, and are stored in the same database.

In some embodiments, a module (e.g., a namespace daemon) that operates on the host machine monitors the database for changes relating to logical services nodes, and is responsible for starting up the DHCP service based on the database table entries. This namespace daemon creates the namespace on the host machine, and starts the DHCP module operating in the namespace. In addition, the namespace daemon generates a configuration file for the DHCP module that defines the DHCP configuration from the user in language readable by the DHCP module.

This configuration file is a text file in some embodiments with data written in a meta-language of the DHCP module. To generate the configuration file, the namespace daemon of some embodiments defines the logical switch as a subnet, and defines the MAC-to-IP bindings for the subnet in the configuration file. In addition, the namespace daemon defines the options in the configuration file. However, some options may be available for the logical DHCP service, but not supported by the DHCP module implementing that DHCP service. For these options, the namespace daemon determines a way to implement the specified option in the configuration file with features that are supported by the DHCP module (e.g., by using a combination of supported options, definitions, etc.).

When modifying the DHCP configuration for a particular service, in some embodiments the namespace daemon can either modify the configuration file and then restart the DHCP module, or perform the modifications while the DHCP module is running (without a restart). Some embodiments only perform certain smaller, more common modifications (e.g., changes to host-specific options, modifications to single host MAC:IP bindings, etc.) during runtime. Other, larger modifications (e.g., per logical switch or global options, addition or removal of a logical switch, etc.) require a restart.

Once the DHCP module is operational, machines on a logical switch connected to the logical service node can use the DHCP service. Because DHCP packets are broadcast, when a machine (e.g., a virtual machine) sends out a DHCP discovery packet, the forwarding element located on the host machine with the VM sends the packet to all destinations on the logical switch in some embodiments. This includes the logical service node, as well as all other VMs (which ignore the packet). When the logical service node is implemented on two host machines, with an active and a standby implementation, the forwarding element at the VM's host machine sends the DHCP discovery packet to only the active implementation (e.g., via a tunnel between the hosts). The DHCP module receives the packet, and the DHCP process proceeds according to protocol in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network control system that enables Dynamic Host Configuration Protocol (DHCP) services for logical networks. Specifically, the network control system of some embodiments enables the provisioning of DHCP services in a centralized manner accessible by all of the machines connected to a logical network. In some embodiments, the network control system provides DHCP services within a service node that is part of the logical network, and which may additionally provide other services (e.g., metadata proxy, DNS, etc.).

In some embodiments, a user (e.g., an administrator) may configure a logical network (e.g., a collection of logical switches, routers, middleboxes, services, etc.) for implementation across a physical network (e.g., numerous host machines in a multi-tenant data center). In some embodiments, the logical network may include logical service nodes, which provide the DHCP services in addition to other services, as mentioned above. The user may configure the logical service nodes to attach to one or more logical switches in the logical network in some embodiments.

Figure 1:
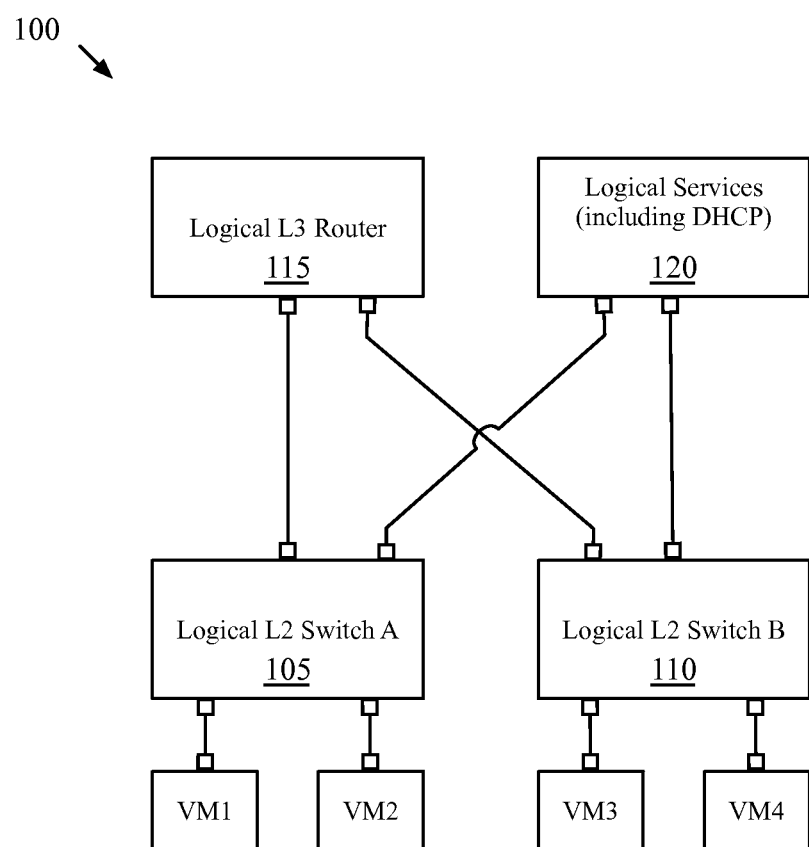
FIG. 1 conceptually illustrates a logical network architecture of some embodiments that includes a logical service node.

FIG. 1 conceptually illustrates such a logical network architecture 100 of some embodiments. As shown, the logical network 100 includes two logical switches 105 and 110, a logical router 115, and a logical service node 120. Each of the logical switches 105 and 110 connects several virtual machines (in this case, two virtual machines (VMs) are connected by each logical switch), and the logical router 115 connects the two logical switches (i.e., logical L2 domains) together.

In addition, the logical service node 120 connects to the logical switches 105 and 110 in order to provide various network services to the logical switches (i.e., to entities connected to logical switches, such as VMs, physical servers connected through top of rack switches, L2 segments, etc.). In some embodiments, these network services include DHCP, metadata proxy, DNS, DHCP relay, and other services. Metadata proxy, in some embodiments, is a service accessed by virtual machines in a datacenter that provides various information to the virtual machines. When VMs start up, a program on the VM sends a request to a static IP address to request information about itself, such as what type of VM it is, the time zone in which it is located, what type of networking resources are available, etc. The metadata proxy service at this static IP address provides this information to the VM. In some embodiments, this service is implemented within a logical service node.

In some embodiments, the logical network architecture is restricted such that only logical switches can connect to logical service nodes that provide these network services. However, as shown in this example, multiple logical switches may connect to the logical service nodes in some embodiments. Even with such restrictions, one of ordinary skill in the art will recognize that multiple different logical network architectures may be created. For example, the logical router might have a connection to external networks, additional logical switches may be connected to the logical router, etc.

Figure 2:
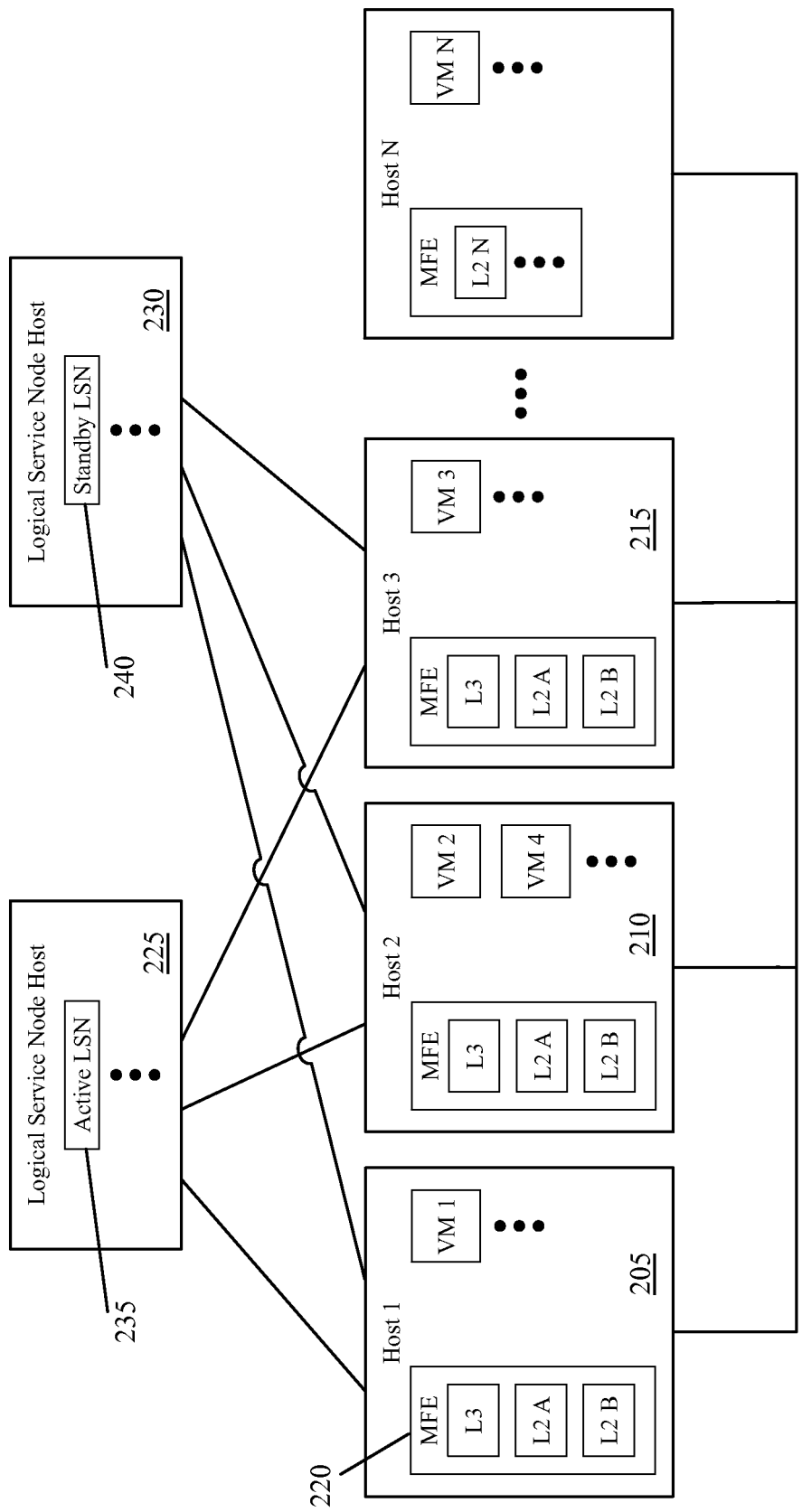
FIG. 2 conceptually illustrates a physical implementation of the logical network architecture of FIG. 1 according to some embodiments.

FIG. 2 conceptually illustrates a physical implementation 200 of the logical network architecture 100 according to some embodiments. As shown, some embodiments implement the logical switching and routing elements (collectively referred to as logical forwarding elements) in a distributed, virtualized fashion. That is, rather than using physical switches and routers to implement the logical forwarding elements, the forwarding responsibilities are spread across managed forwarding elements (MFEs) distributed throughout the network. For instance, some embodiments include packet processing (i.e., switching and routing) software within the physical host machines that host the VMs (e.g., running on top of or within virtualization software on the host). This packet processing software (e.g., open virtual switch ("OVS")) implements the logical forwarding elements of one or more logical networks in some embodiments.

In this case, the logical forwarding elements 105-115 of the network 100 are distributed across three host machines 205-215 that host the virtual machines connected through the logical network 100. In some embodiments, as shown, the MFE on each of these hosts implements all of the logical forwarding elements of the network. The first host 205 hosts VM1, which connects to logical switch 105. However, the MFE 220 on this host implements the logical switch 110 and the logical router 115 in addition to the logical switch 105. In some embodiments, all or most of the logical processing on a packet is performed at the first MFE that receives the packet. For traffic originating at a VM, this first hop is the MFE at the host on which the VM operates. As such, if the VM sends packets to a VM on a different logical switch (e.g., VM1 sending a packet to VM3), the MFE at that host needs to be able to process the packet through its logical switch as well as the connecting logical router and the destination logical switch.

Unlike the logical forwarding elements, the DHCP and other services provided by the logical service node are not distributed in some embodiments. The physical implementation 200 of the logical network includes two logical service node hosts 225 and 230. Each of the host machines 205-215 that implements the logical network 100 connects to both of these service node host machines 225 and 230.

As indicated in the figure, while the logical service node 120 is implemented on two service node hosts 225 and 230, one of these is an active (or master) implementation 235 (on host 225) and the other is a standby (or backup) implementation 240 (on host 230). In some embodiments, the physical network in which the logical networks are implemented includes a set of host machines specifically for hosting the logical service nodes, and each of these host machines may host several logical service nodes. In other embodiments, the cluster of host machines for hosting logical service nodes may also host (i) centralized logical routers for logical networks and/or (ii) L3 gateways for processing L3 traffic in and out of the managed network. Although the example logical network in FIG. 2 shows the logical router 115 implemented in a distributed fashion in the MFEs residing on hosts 205-215, in some embodiments all L3 traffic is sent to a separate centralized host machine for routing. Furthermore, if the logical router 115 included a port that connected to an external unmanaged network, some embodiments use a L3 gateway for processing traffic in and out of that port.

In some embodiments, the physical infrastructure that implements the logical networks is managed by a network control system, including a controller cluster (one or more network controllers, which are hierarchically arranged in some embodiments). The controller cluster, in addition to managing the MFEs at the host machines, is responsible for balancing the logical service nodes of various logical networks (e.g., for different tenants) across the aforementioned set of host machines for the logical service nodes.

In some embodiments, the network controller cluster selects two host machines from the set to implement each logical service node, with a first host machine operating the active implementation and a second host machine operating the standby implementation. Thus, a particular one of the host machines may have the master implementations of several different logical service nodes, the backup implementations of several different logical service nodes, or a combination thereof. For instance, the logical service node host 225 that has the active logical service node implementation might also host the standby logical service node for a different logical network.

While the examples described herein use one active and one standby implementation for each logical service nodes, different embodiments may implement logical service nodes in different configurations. For example, some embodiments select two or more host machines to implement each logical service node, with each of these implementations active (rather than having a backup). When a VM or other host sends a request to the logical service node, the MFE to which that VM/host connects selects one of the several active logical service node implementations as a destination for the packet. For multi-stage DHCP (e.g., the standard discovery/offer/request/acknowledgement operation of the protocol), the MFE ensures that all packets from a given source are sent to the same logical service node host. In the case of static DHCP, no communication is required between the active logical service node implementations. For dynamic DHCP, on the other hand, the various active implementations share state so as to keep up to date on which IP addresses have been assigned.

The logical service nodes 235 and 240 are implemented in containers that run on the host machines 225 and 230 in some embodiments, such as virtual machines or namespaces. A namespace, in some embodiments, is a lightweight container (less computationally intensive than a virtual machine) that can operate on a host machine. Various processes can run in a namespace. Thus, with each logical service node implemented by a namespace running on a host machine, each of the services provided by that node may run as processes in the namespace. For DHCP service, a DHCP module (e.g., an open source dhcp daemon) runs in the namespace. Each of the namespaces operating on a particular host may have a different instance of the DHCP module operating a DHCP service for a different logical network.

When a user configures a DHCP service for a logical network, the controller cluster of some embodiments generates data tuples that represent the DHCP configuration. In order to specify the DHCP configuration, in some embodiments the user specifies a logical services node, attaches one or more logical switches to the node, provides MAC-to-IP bindings (i.e., for static DHCP) and DHCP options for the machines connected to the logical switch, among other actions. The controller cluster, in addition to specifying one or more host machines on which to implement the service, then transforms this configuration into a set of data tuples that define a namespace, defines a DHCP process for the namespace, defines the logical switch, and defines the DHCP configuration (including the address bindings and options). Some embodiments provide static DHCP, in which the address bindings map each MAC address of the machines connected to the logical switch to a specific IP address. The DHCP options may be global (i.e., for all hosts on all logical switches that use the particular DHCP service), applied to a particular logical switch (i.e., for all hosts on the logical switch), or applied to a specific host.

The controller cluster is responsible for distributing these data tuples to the appropriate host machines (e.g., the master and backup hosts for a particular logical service node). These host machines receive the data tuples and store the tuples as database tables having a particular format (e.g., OVSdb). In some embodiments, the data tuples are received in a similar format to data tuples relating to virtual switch configuration on the host machine, and are stored in the same database.

In some embodiments, a module (e.g., a daemon) that operates on the host machine monitors the database for changes relating to logical services nodes, and is responsible for starting up the DHCP service based on the database table entries. This namespace daemon creates the namespace on the host machine, and starts the DHCP module operating in the namespace. In addition, the namespace daemon generates a configuration file for the DHCP module that defines the DHCP configuration from the user in language readable by the DHCP module.

This configuration file is a text file in some embodiments with data written in a particular language readable by the DHCP module. To generate the configuration file, the namespace daemon of some embodiments defines the logical switch as a subnet, and defines the MAC-to-IP bindings for the subnet. In addition, the namespace daemon defines the options in the configuration file. However, some options may be available for the logical DHCP service, but not supported by the DHCP module implementing that DHCP service. For these options, the namespace daemon determines a way to implement the specified option in the configuration file with features that are supported by the DHCP module (e.g., by using a combination of supported options, definitions, etc.).

When modifying the DHCP configuration for a particular service, in some embodiments the namespace daemon can either modify the configuration file and then restart the DHCP module, or perform the modifications while the DHCP module is running (without a restart). Some embodiments only perform certain smaller modifications (e.g., changes to host-specific options, modifications to single host MAC:IP bindings, etc.) during runtime. Other, larger modifications (e.g., per logical switch or global options, addition or removal of a logical switch, etc.) require a restart.

Once the DHCP module is operational, machines on a logical switch connected to the logical service node can use the DHCP service. Because DHCP packets are broadcast, when a machine (e.g., a virtual machine) sends out a DHCP discovery packet, the forwarding element located on the host machine with the VM sends the packet to all destinations on the logical switch in some embodiments. This includes the logical service node, as well as all other VMs (which ignore the packet). When the logical service node is implemented on two host machines, with an active and a standby implementation, the forwarding element at the VM's host machine sends the DHCP discovery packet to only the active implementation (e.g., via a tunnel between the hosts). The DHCP module receives the packet, and the DHCP process proceeds according to protocol in some embodiments.

The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

The above description introduces the provision of services, specifically DHCP, for logical networks of some embodiments. Several more detailed embodiments are described below. First, Section I describes the provisioning of logical service nodes and DHCP by the network control system of some embodiments. Section II then describes the generation of a DHCP configuration on the host based on the information received from network controllers in some embodiments. Next, Section III describes runtime DHCP processing of some embodiments once a logical service node is configured. Finally, Section IV describes an electronic system with which some embodiments of the invention are implemented.

I. DHCP Configuration by Network Controllers

As mentioned, in some embodiments a network control system sets up and configures the DHCP service for a logical network. One or more network controllers in the network control system receive the DHCP configuration input by an administrator and convert this information into data tuples that can be read by the host machine(s) which implement the DHCP service, in addition to selecting the one or more host machines to use for the service. The network control system also distributes the data tuples to these host machines.

Figure 3:
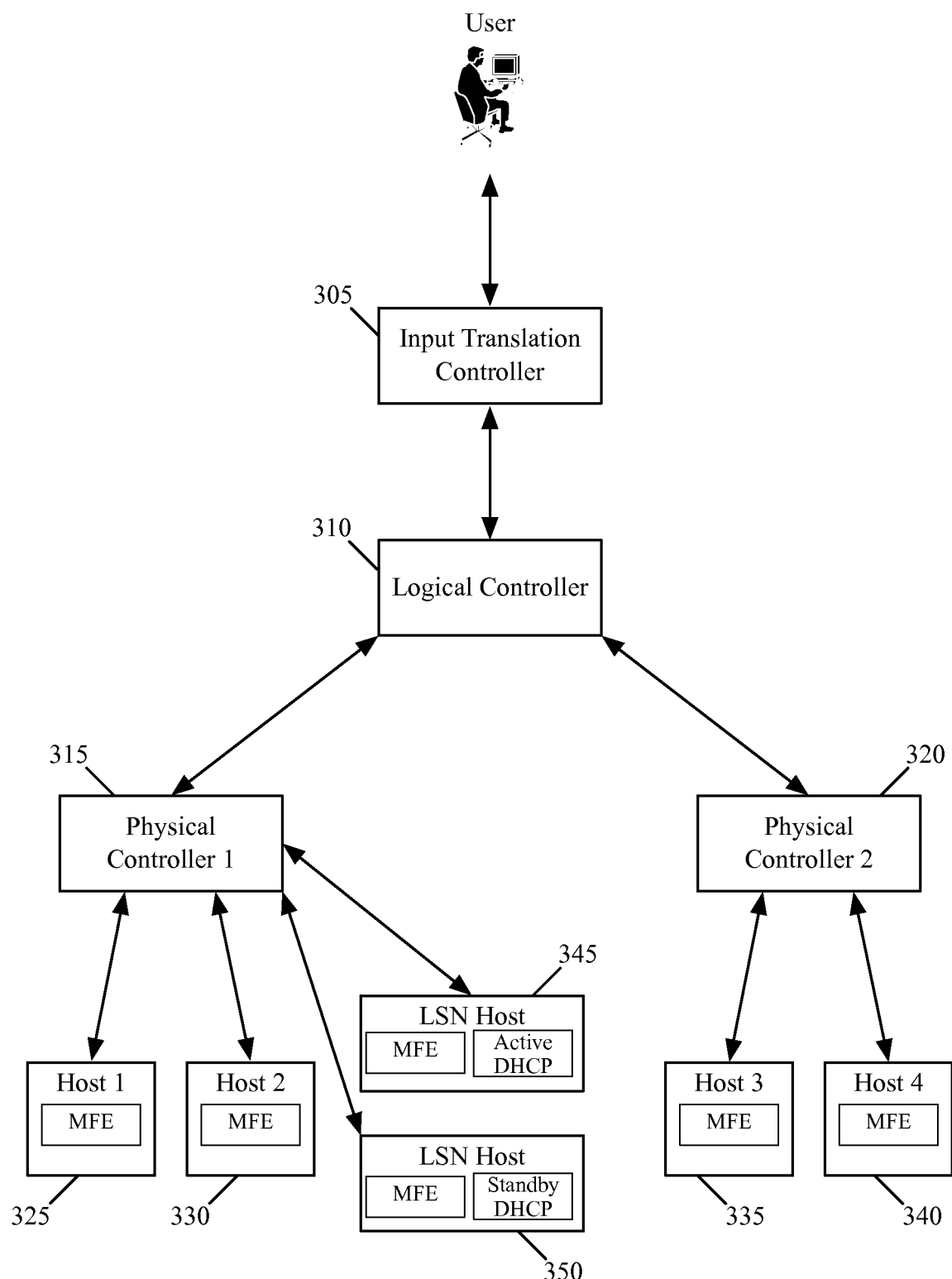
FIG. 3 conceptually illustrates a network control system of some embodiments for configuring managed forwarding elements and logical service nodes in order to implement logical networks.

FIG. 3 conceptually illustrates such a network control system of some embodiments for configuring managed forwarding elements and logical service nodes in order to implement logical networks. As shown, the network control system 300 includes an input translation controller 305, a logical controller 310, physical controllers 315 and 320, hosts 325-340, and two logical service node hosts 345 and 350. As shown, the hosts 325-340 (as well as the logical service node hosts 345 and 350) include managed forwarding elements, which may be implemented as shown above in FIG. 2. One of ordinary skill in the art will recognize that many other different combinations of the various controllers and hosts are possible for the network control system 300.

In some embodiments, each of the controllers in a network control system has the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 305 and the logical controller 310 may run in the same computing device, with which a data center management application interacts (or with which an administrator interacts directly).

The input translation controller 305 of some embodiments includes an input translation application that translates network configuration information received from a user. While shown as receiving the information directly from a user, in some embodiments a user interacts with a data center management application, which in turn passes the network configuration information to the input translation controller.

For example, a user may specify a network topology such as that shown in FIG. 1. For each of the logical switches, the user specifies the machines that connect to the logical switch (i.e., to which logical ports are assigned for the logical switch). The user may also specify which logical switches attach to any created logical service nodes, which logical services should be offered by each logical services node, and the configurations for those logical services. The input translation controller 305 translates the entered network topology into logical control plane data that describes the network topology. For example, an entry might state that a particular MAC address A is located at a first logical port X of a particular logical switch, or that a logical service node Q is located at a second logical port Y of the particular logical switch.

In some embodiments, each logical network is governed by a particular logical controller (e.g., logical controller 310). The logical controller 310 of some embodiments translates the logical control plane data that defines the logical network into logical forwarding plane data, and the logical forwarding plane data into universal control plane data. Logical forwarding plane data, in some embodiments, consists of flow entries described at a logical level. For the MAC address A at logical port X, logical forwarding plane data might include a flow entry specifying that if the destination of a packet matches MAC A, forward the packet to port X. The port of the logical service node Q will also have a MAC address, and similar flow entries are created for forwarding packets to port Y. In addition, some embodiments include flow entries for sending broadcast packets to several ports, which includes port Q. As such, DHCP packets that are sent as broadcast packets will reach the correct port.

The universal physical control plane of some embodiments is a data plane that enables the control system of some embodiments to scale even when it contains a large number of managed forwarding elements (e.g., thousands) to implement a logical data path set. The universal physical control plane abstracts common characteristics of different managed forwarding elements in order to express physical control plane data without considering differences in the managed forwarding elements and/or location specifics of the managed forwarding elements.

As stated, the logical controller 310 of some embodiments translates logical control plane data into logical forwarding plane data (e.g., logical flow entries), then translates the logical forwarding plane data into universal control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., n Log tables), and the controller applications use a table mapping engine (e.g., an n Log engine) to translate between the data planes. The input and output tables, in some embodiments, store sets of data tuples that define the data planes.

Each of the physical controllers 315 and 320 is a master of one or more managed forwarding elements (e.g., located within host machines). In this example, each of the two physical controllers is a master of two managed forwarding elements located at the host machines. Furthermore, the physical controller 315 is the master of the two logical service node hosts 345 and 350, which host the active and standby logical service nodes (with DHCP service) for a particular logical network (e.g., logical network 100). In some embodiments, the active and standby hosts for a logical service node are managed by the same physical controller (as in this figure), while in other embodiments separate physical controllers managed the hosts.

In some embodiments, a physical controller receives the universal physical control plane information for a logical network and translates this data into customized physical control plane information for the particular managed forwarding elements that the physical controller manages. In other embodiments, the physical controller passes the appropriate universal physical control plane data to the managed forwarding element, which has the ability (e.g., in the form of a chassis controller running on the host machine) to perform the conversion itself.

The universal physical control plane to customized physical control plane translation involves a customization of various data in the flow entries. For the example noted above, the universal physical control plane would involve several flow entries. The first entry states that if a packet matches the particular logical data path set (e.g., based on the packet being received at a particular logical ingress port), and the destination address matches MAC A, then forward the packet to logical port X. This flow entry will be the same in the universal and customized physical control planes, in some embodiments. Additional flows are generated to match a physical ingress port (e.g., a virtual interface of the host machine) to the logical ingress port X (for packets received from MAC A, as well as to match logical port X to the particular egress port of the physical managed switch. However, these physical ingress and egress ports are specific to the host machine containing the managed switching element. As such, the universal physical control plane entries include abstract physical ports while the customized physical control plane entries include the actual physical ports involved.

In some embodiments, as shown, the logical service node hosts 345 and 350 also operate managed forwarding elements (e.g., using the same packet processing software as the hosts 325-340). These MFEs also receive physical control plane data from the physical controller that enables the MFEs to implement the logical forwarding elements. In addition, some embodiments distribute the DHCP configuration data to the logical service node hosts through the hierarchical network control system. The logical controller 310 that manages the logical network containing a logical service node selects the active and standby hosts for the logical service node (e.g., using a load balancing algorithm that spreads the logical service nodes for various logical networks across a set of hosts).

The logical controller identifies the physical controller(s) that manages each of these selected LSN hosts, and distributes the configuration to the identified physical controllers. In some embodiments, the configuration is distributed as a set of data tuples. The physical controllers then distribute these data tuples to the LSN hosts. Both the active and standby hosts receive the same DHCP configuration, in some embodiments. As described in detail below in Section II, the LSN hosts convert these data tuples into a configuration readable by the DHCP module that operates on the host.

Figure 4:
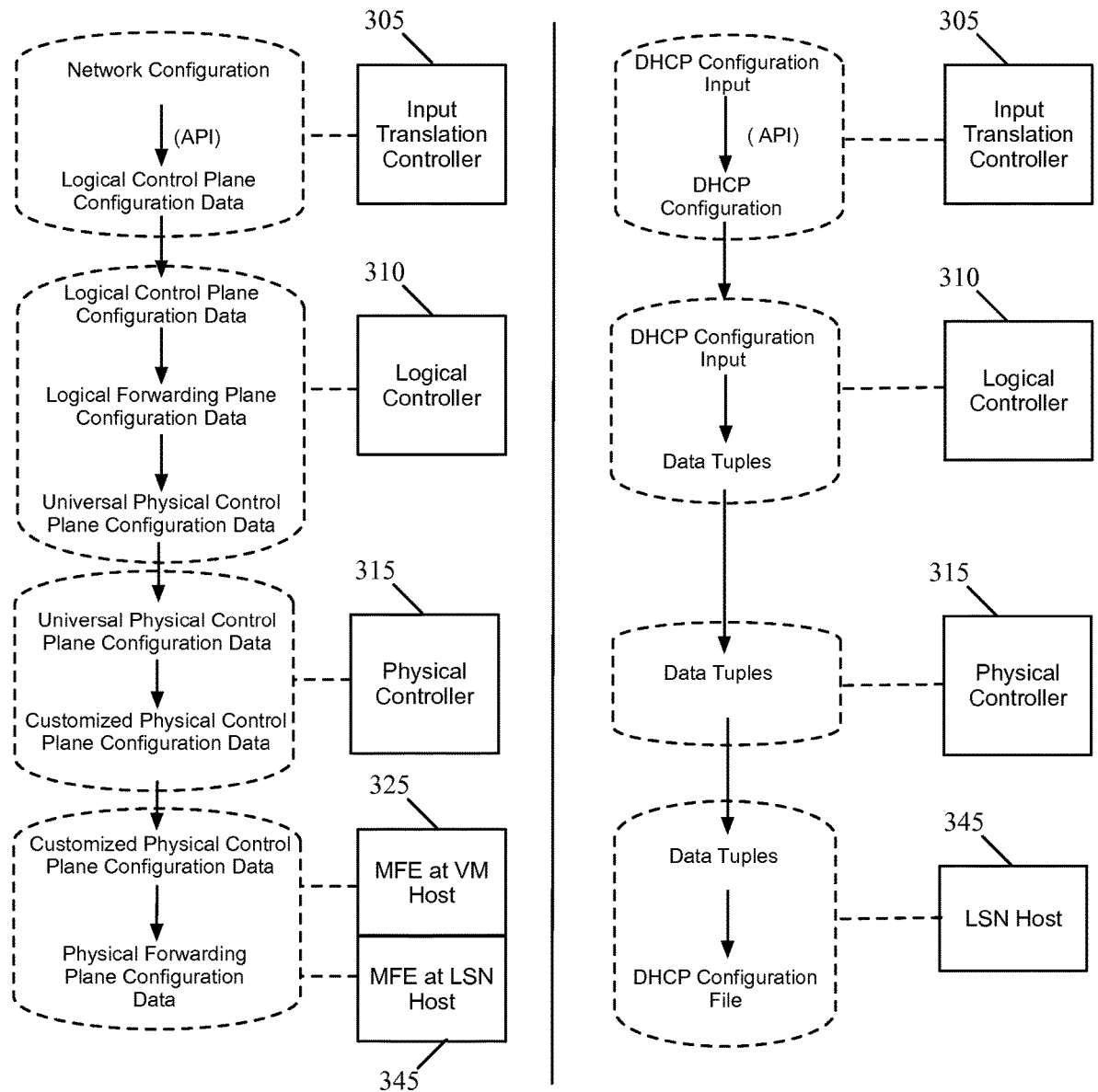
FIG. 4 conceptually illustrates the propagation of data through the hierarchical network control system of some embodiments.

The above describes the hierarchical controller cluster of some embodiments, although the network control system of other embodiments includes only a single controller (or controller cluster with one active and one or more backup controllers). FIG. 4 conceptually illustrates the propagation of data through the hierarchical network control system of some embodiments. The left side of this figure shows the data flow to the managed forwarding elements to implement the logical forwarding elements of the logical network, while the right side of the figure shows the propagation of DHCP configuration data to the LSN hosts in order to setup and configure the DHCP service for the logical network.

On the left side, the input translation controller 305 receives a network configuration through an API, which is converted into logical control plane data. This network configuration data includes a logical topology such as that shown in FIG. 1. The network configuration specifies attachments of logical switches to logical service nodes in some embodiments, with MAC and IP addresses assigned to each logical service node port that connects to a logical switch.

As shown, the logical control plane data is converted by the logical controller 310 (specifically, by a control application of the logical controller) to logical forwarding plane data, and then subsequently (by a virtualization application of the logical controller) to universal physical control plane data. In some embodiments, these conversions generate a flow entry (at the logical forwarding plane), then add a match over the logical data path set (at the universal physical control plane). The universal physical control plane also includes additional flow entries for mapping generic physical ingress ports (i.e., a generic abstraction of a port not specific to any particular physical host machine) to logical ingress ports as well as for mapping logical egress ports to generic physical egress ports. For instance, for the mapping to a logical service node port, the flow entries at the universal physical control plane would include a forwarding decision to send a packet to the logical port to which the logical service node connects when the destination MAC address of the packet matches that of the logical service node port. In addition, the universal physical control plane entries would include a mapping of the logical port to a generic physical port of a host machine that connects to the LSN host on which the logical service node resides, and generic tunneling entries for encapsulating the packet in a tunnel to the LSN host with the active logical service node.

The physical controller 315 (one of the several physical controllers), as shown, translates the universal physical control plane data into customized physical control plane data for the particular managed forwarding elements that it manages at hosts 325, 330, 345, and 350. This conversion involves substituting specific data (e.g., specific physical ports) for the generic abstractions in the universal physical control plane data. For instance, in the example of the above paragraph, the port integration entries are configured to specify the physical layer port appropriate for the particular logical service node connection (i.e., an actual physical port of the particular host machine on which the managed switching element operates).

The managed forwarding element at host 325 (one of several MFEs managed by the physical controller 315) performs a translation of the customized physical control plane data into physical forwarding plane data. The physical forwarding plane data, in some embodiments, are the flow entries stored within a switching element (either a physical router or switch or a software switching element) against which the switching element actually matches received packets. In addition, the MFEs at both of the logical service node hosts 345 and 350 perform such a translation in order to forward packets between the logical service nodes and the other network entities (e.g., VMs).

The right side of FIG. 4 illustrates data propagated to the logical service node hosts (e.g., host 345) to implement a DHCP service for a logical network, rather than to the MFEs. As shown, the input translation controller receives a DHCP configuration input. The network control system may receive this data along with the logical network configuration or as a separate set of inputs. For instance, an administrator might create a logical service node in a logical network, but then enter a DHCP configuration at a later time. In addition, the DHCP configuration may be modified by an administrator while the system is running. In some embodiments, the data flow illustrated in FIG. 4 is performed by the network control system each time a logical service node is created, an attachment between a logical service node and a logical switch is created or removed, a DHCP service is added or removed from a logical service node, or a DHCP service is modified, among other actions. As shown, the DHCP configuration input is translated by the input translation controller into a DHCP configuration that the network control system can convert into data tuples.

The logical controller 310 is responsible for generating a set of data tuples that describe the DHCP configuration. For instance, when a logical service node is created, the logical controller of some embodiments selects an active LSN host and a standby LSN host, then creates a new data tuple (i.e., a record) that specifies the existence of a new namespace (or other container) on the host. If DHCP is enabled, some embodiments modify a value of this record, or create a different record, indicating that a DHCP module should operate in the namespace.

Similarly, for each VM or other machine added to the DHCP service, the logical controller generates a record that stores the MAC address, IP address, any DHCP options, and an associated port, or interface. Because a logical service node may provide DHCP service for multiple different logical switches, each VM record is associated with the interface to which the VM's logical switch connects. This enables the DHCP service to use the correct records when receiving DHCP requests.

In addition, records are created to store information for each logical switch. Specifically, DHCP options may be configured to apply to all hosts on a logical switch. These records, in some embodiments, associate an interface (i.e., the interface of the logical services node to which the logical switch connects) with the associated DHCP options for the logical switch. Similarly, some embodiments create records to store DHCP options that should be applied globally, to all VMs (or other machines) connected to logical switches attached to the logical service nodes.

Once the logical controller 310 creates the data tuples and identifies the LSN hosts that will receive the data tuples, the logical controller then identifies the physical controller or controllers that manage the LSN hosts. As mentioned, like the VM hosts 325-340, each of the LSN hosts has an assigned master physical controller. In the example of FIG. 3, both of the LSN hosts are managed by the physical controller 315, so the other physical controller 320 does not receive the DHCP data tuples.

In order to supply the DHCP configuration data to the LSN hosts, the logical controller 310 of some embodiments pushes the data (using an export module that accesses the output of the table mapping engine in the logical controller) to the physical controller 315. In other embodiments, the physical controllers request configuration data (e.g., in response to a signal that the configuration data is available) from the export module of the logical controller.

The physical controller 315 passes the data to the LSN hosts, including 330, much as they pass the physical control plane data. In some embodiments, the DHCP configuration and the physical control plane data for the MFE are sent to the same database running on the LSN host machine, and the MFE and namespace implementing the LSN retrieve the appropriate information from the database (or have the appropriate information passed to them).

In some embodiments, a process on the LSN host 345 translates the data tuples into a DHCP configuration file readable by the DHCP module operating within the namespace. In some embodiments, this configuration file is a text file with meta-language defining the DHCP service. For each logical switch, the configuration file defines a subnet, and then defines the MAC to IP bindings and DHCP options for each machine in the subnet. The configuration file generation of some embodiments is described in further detail below in Section II.

Figure 5:
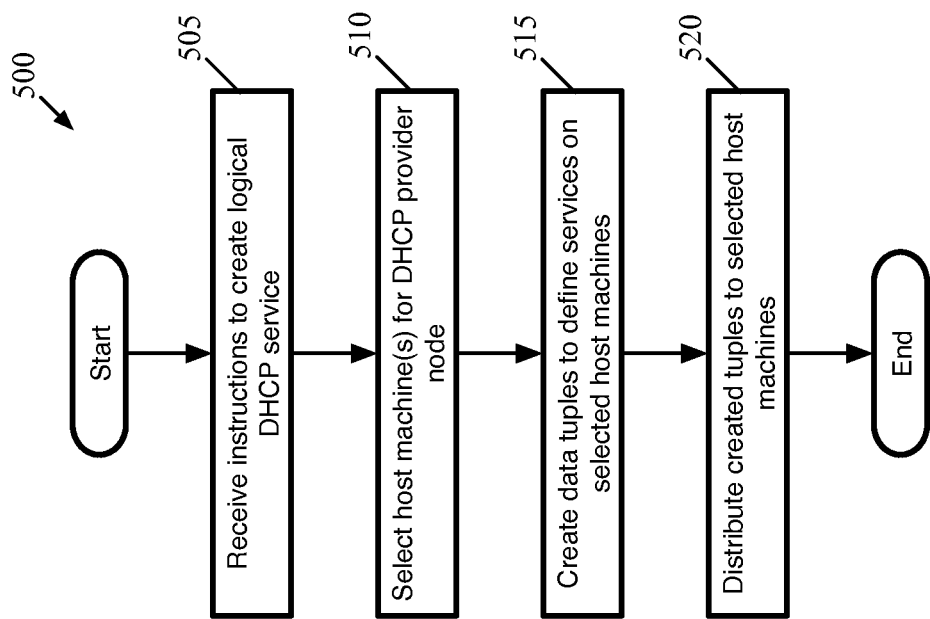
FIG. 5 conceptually illustrates a process performed by the logical controller in some embodiments to assign a newly created DHCP service and its corresponding logical service node to a set of host machines.

FIG. 5 conceptually illustrates a process 500 performed by the logical controller in some embodiments to assign a newly created DHCP service and its corresponding logical service node to a set of host machines. In other embodiments that use a single controller, or single master controller with one or more backups, the single controller performs process 500.

As shown, the process 500 begins by receiving (at 505) instructions to create a logical DHCP service. These instructions, in some embodiments, are received through an API as a combination of (i) instructions to create a new logical service node, (ii) instructions to create a port on the logical service node to which a logical switch will attach, and (ii) instructions to enable a DHCP service for the port. In some cases, a user might create a logical network that includes a logical service node with one or more ports attached to logical switches, but not yet active DHCP service on the logical service node. At a later time, the user would then activate the DHCP service. The attachment of the logical switch to the port, in some embodiments, may also be received through the API and handled by the logical controller in order to generate flow entries for sending packets to the logical service node.

The process 500 then selects (at 510) one or more host machines for the logical DHCP service (i.e., for the logical service node that offers the DHCP service). As mentioned, in some embodiments the logical controller load balances the logical service nodes across a cluster of host machines designated for hosting logical service nodes. These host machines, in some embodiments, are of the same type as the VM hosts or L3 gateway service hosts (e.g., x86 boxes), but designated as a cluster for logical service nodes.

Different logical controllers may run different load balancing algorithms in some embodiments. When each logical service node is created as a namespace on two such host machines (i.e., one master and one backup), some embodiments attempt to operate as close to the same number of namespaces on each host machine as possible. In addition, some embodiments try to have an equal number of master and backup logical service nodes on a given host machine, so as to minimize the number of master logical service nodes on any one machine in case of a failure and subsequent failover. In addition, the master logical service nodes receive substantially more traffic, and therefore require more resources, than the backup logical service nodes. Other embodiments factor in the number of services offered, number of VMs (or other machines) that access the services provided by a logical service node, actual traffic received/sent by the logical service node, and other factors in determining how to load balance the logical service nodes across a cluster.

Figure 6:
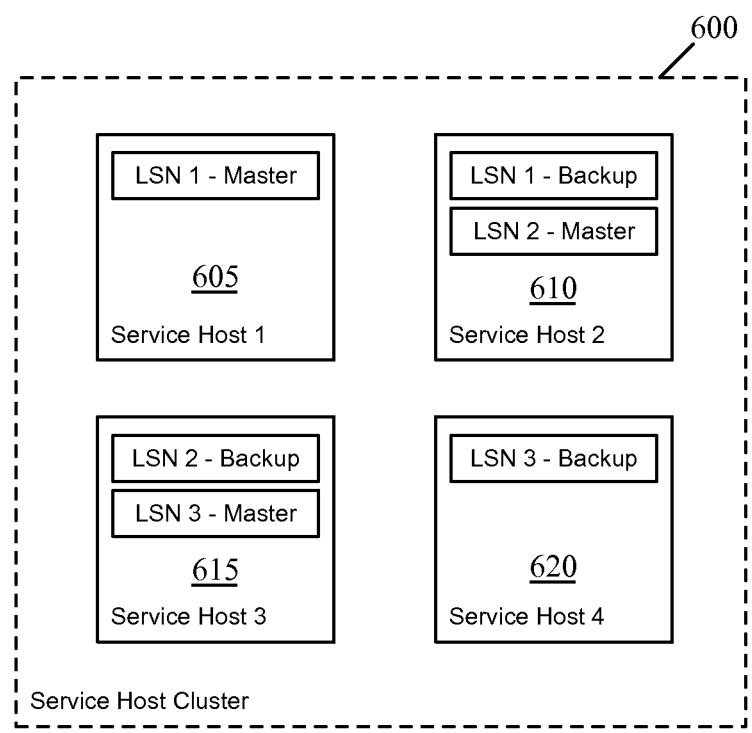
FIG. 6 conceptually illustrates a service host cluster that includes four host machines.

FIG. 6 conceptually illustrates a service host cluster 600 that includes four host machines 605-620. As shown, three logical service nodes have been created on this cluster, with two instances (one master and one backup) for each. The first host 605 hosts the master for LSN 1, the second host 610 hosts the backup for LSN 1 and the master for LSN 2, the third host 615 hosts the backup for LSN 2 and the master for LSN 3, and the fourth host 620 hosts the backup for LSN 3. If the controller cluster that manages this service host cluster 600 receives instructions to create a new logical service node, some embodiments would place the master for this new LSN 4 on the host machine 620 and the backup on host 605. However, if LSN 1 was especially computationally intensive (e.g., because it provides several services for numerous logical switches with many connected VMs), while LSN 2 and LSN 3 have fewer connected VMs and are not as computationally intensive, some embodiments would locate the backup for the new LSN 4 on, e.g., host 615.

Returning to the process 500, after selecting the one or more host machines for the logical service node, the process then creates (at 515) data tuples to define the DHCP service on the selected host machines. For instance, in some embodiments the network controller creates a data tuple to define a container (e.g., namespace). The data tuple's existence defines the existence of the namespace, and various other data in the tuple may define the configuration of the namespace. As an example, a flag for enabling DHCP service can be set to either true or false in the data tuple of some embodiments, and global DHCP options (i.e., options to apply to all hosts that use the logical service node DHCP service) may be set in the data tuple for the namespace. In addition, other services (e.g., metadata proxy, DNS, etc.) may be enabled or disabled through this data tuple. In some embodiments, the network control system also uses namespaces for logical routers, but turns off IP forwarding for logical service node namespaces. When a user has already created a logical service node (which is already implemented in a namespace), but later turns on DHCP service for the logical service node, the controller modifies the data tuple for the already-created namespace to enable this DHCP service.

After generating the data tuples (or modifying previously created data tuples), the process 500 distributes (at 520) the created tuples to the selected host machines. As described above, in some embodiments the logical controller distributes the data tuples to the physical controllers that manage the selected host machines (through either a push or pull mechanism). These physical controllers subsequently distribute the data tuples to the host machines in order for the host machines to instantiate a namespace and/or a DHCP process within the namespace.

Figure 7:
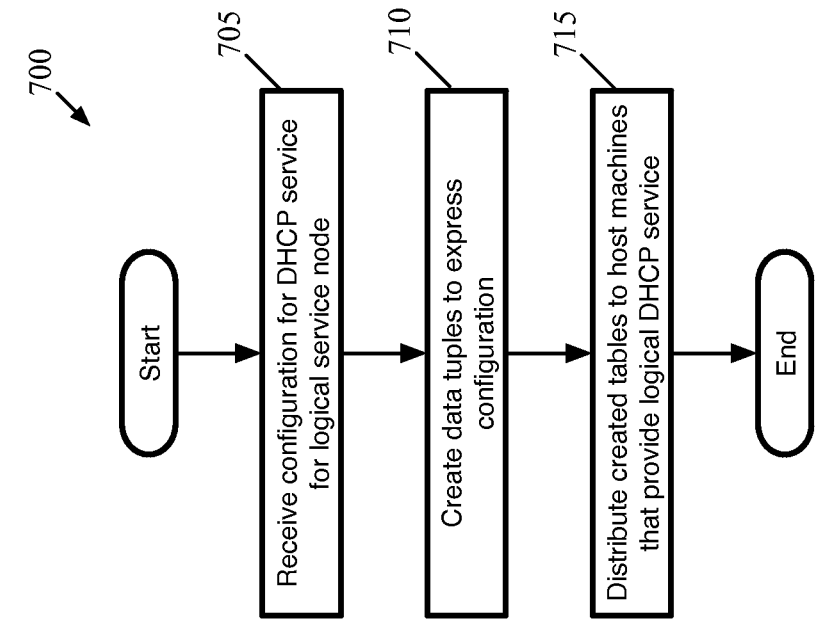
FIG. 7 conceptually illustrates a process performed by the logical controller in some embodiments to configure a DHCP service for a logical service node.

FIG. 7 conceptually illustrates a process 700 performed by the logical controller in some embodiments to configure a DHCP service for a logical service node. In other embodiments that use a single controller, or single master controller with one or more backups, the single controller performs the process 700.

As shown, the process 700 begins by receiving (at 705) a configuration for a DHCP service for a logical service node. As with the instructions to create a DHCP service, some embodiments receive this configuration through an API. The configuration may include settings for specific ports (i.e., settings that apply to all VMs or other hosts associated with a particular port of the logical service node). As each of the ports corresponds to a logical switch, the settings for the interface apply to all VMs that connect to the logical switch attached to the interface. These settings may include values for DHCP options to apply to all VMs on the logical switch (e.g., specific static routes). The configuration may also include a set of MAC to IP bindings for a particular interface. That is, for MAC addresses requesting an IP address through a particular interface of the logical service node, the configuration provides the IP address that should be offered. In addition, the configuration may include a set of DHCP options and their values for each host.

The process 700 then creates (at 710) data tuples for the received configuration. Some embodiments create a data tuple for each interface of the logical service node that uses the DHCP service. This data tuple, in some embodiments, maps the interface to the set of DHCP options for the logical switch attached to the interface. In addition, some embodiments create a data tuple for each VM or other host. The VM configuration data tuple for the DHCP service includes a MAC address for the VM, an IP address for the VM, a set of DHCP options, and the interface of the logical service node that will receive DHCP requests from the VM. In some embodiments, the DHCP options, whether global, per logical switch, or per VM are expressed as key-value pairs in the data tuple. The key is the DHCP option, with a corresponding value for that option.

In some cases, a user may modify a previously created DHCP configuration. This may entail adding or removing a logical switch attachment (i.e., adding or removing an interface from the logical service node), adding or removing hosts, modifying IP addresses or DHCP options for hosts, etc. In this case, some embodiments modify the existing data tuples, which the logical controller stores.

After generating the data tuples (or modifying previously created data tuples), the process 700 distributes (at 715) the created tuples to the host machines on which the logical service node is active. In some embodiments, the logical controller stores a mapping of logical service nodes to host machines, along with other network topology information. Using this information, the logical service node identifies the physical controller or controllers that manages the host machines where both the master and backup logical service nodes reside, and distributes the data tuples to these physical controllers (through either a push or pull mechanism). These physical controllers subsequently distribute the data tuples to the host machines in order for the host machines to generate a configuration for the DHCP service.

II. Generation of DHCP Configuration on Host

The above section described in detail the receipt of DHCP (and logical service node) configuration data by a controller, and the distribution of that data to the host machines on which the logical service nodes reside (e.g., as namespaces). In some embodiments, the host machine includes various modules (e.g., running as daemons) that are responsible for creating the namespaces, activating DHCP and other services in the namespace, and generating configuration files for the DHCP service, based on the data tuples distributed by the network control system.

Figure 8:
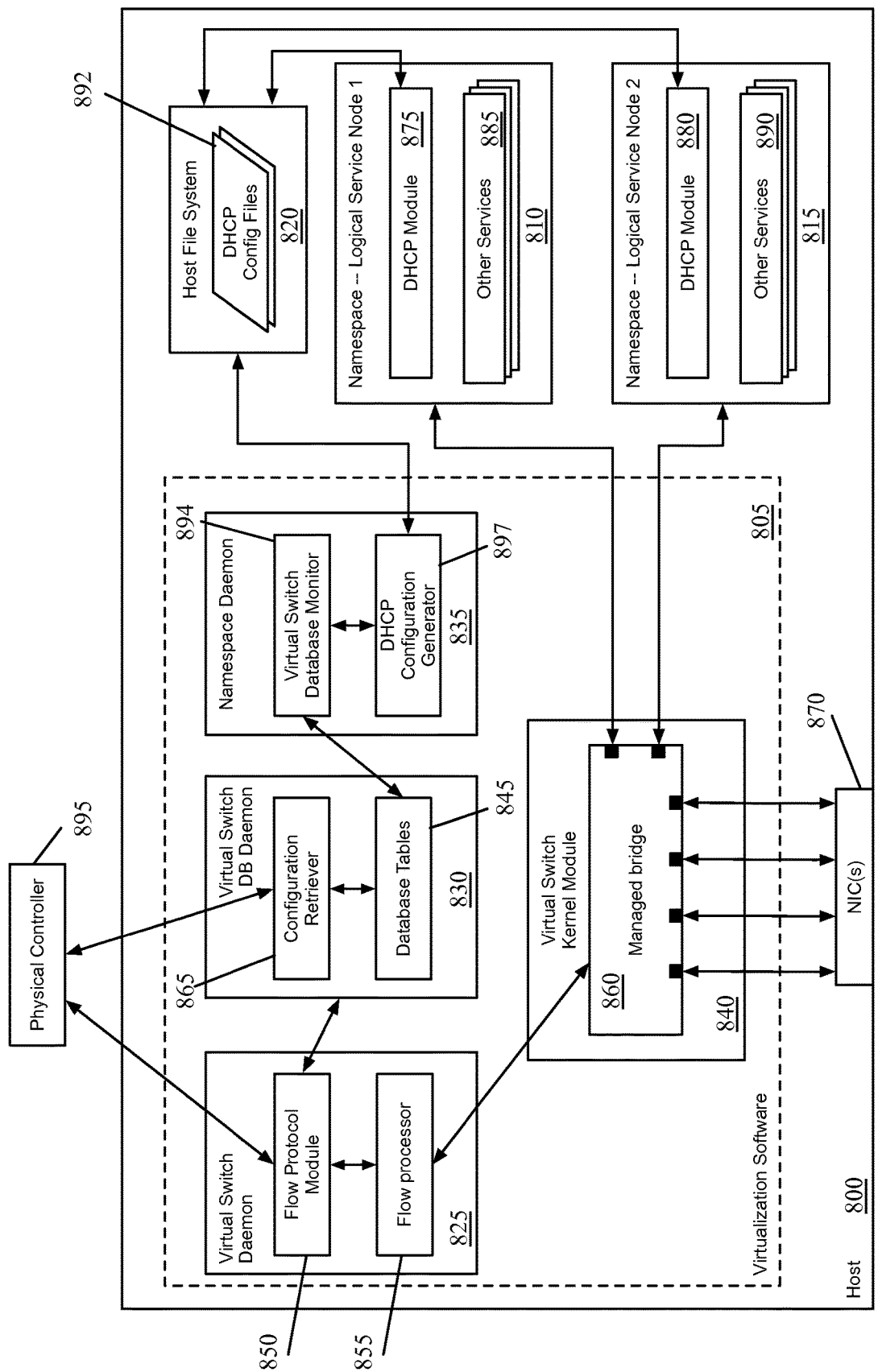
FIG. 8 conceptually illustrates a software architecture of some embodiments for a host.

FIG. 8 conceptually illustrates a software architecture of some embodiments for a host 800. The host 800 is a host designated for hosting logical service node implementations as namespaces. As shown, the host 800 includes virtualization software 805, two namespaces 810 and 815, and a file system 820. In some embodiments, the host includes a base Linux operating system in which the namespaces 810 and 815 run as containers, and the file system 820 is the file system associated with this base operating system.

The virtualization software 805 includes a virtual switch daemon 825, a virtual switch database daemon 830, a namespace daemon 835, and a virtual switch kernel module 840. In some embodiments, the virtual switch daemon, the virtual switch database daemon 830, and the namespace daemon 835 operate in the user space of virtualization software 805, while the virtual switch kernel module 840 operates in the kernel of the virtualization software 805. In some embodiments, the virtual switch used on the host is Open Vswitch (OVS), and these modules are the OVS daemon, OVS DB daemon, and OVS kernel module, in addition to the namespace daemon. One of ordinary skill in the art will recognize that, in addition to the modules shown, which relate to the virtual switch and hosted namespaces, the virtualization software of some embodiments includes additional modules for performing, e.g., virtualization of the hardware resources (e.g., processors, memory, etc.) of the host machine 800.

The virtual switch daemon 825 is an application that communicates with a physical network controller 895 in some embodiments in order to receive instructions for processing and forwarding packets sent to and from the namespaces 810 and 815. Specifically, as described in the previous section, the virtual switch daemon 825 receives physical control plane flow entries from the physical controller 895. The virtual switch daemon, in some embodiments, communicates with the network controller through the OpenFlow protocol, though other embodiments may use different communication protocols for transferring the forwarding data. Additionally, in some embodiments the virtual switch daemon 825 retrieves configuration information from the virtual switch database daemon 830 after the physical controller 895 transmits the configuration information to the virtual switch database daemon.

The virtual switch daemon 825 of some embodiments includes a flow protocol module 850 and a flow processor 855. The flow protocol module 850 handles the communication with the network controller 895 in order to receive physical control plane information (e.g., flow entries) for the virtual switch. As mentioned, in some embodiments this communication uses the OpenFlow protocol. When the flow protocol module 850 receives this physical control plane information, it translates the received information into data understandable by the flow processor 855 (e.g., physical forwarding plane information useable for processing packets).

The flow processor 855 manages the rules for processing and forwarding (i.e., switching, routing) packets in some embodiments. For instance, the flow processor 855 stores rules (e.g., in a storage medium, such as a disk drive) received from the flow protocol module 850. In some embodiments, the rules are stored as a set of flow tables that each includes a set of flow entries. These flow entries, in some embodiments, include a match (i.e., a set of packet characteristics) and one or more actions (i.e., a set of actions to take on packets that match the set of characteristics). In some embodiments, the flow processor 825 handles packets for which the managed bridge 860 (described below) does not have a matching rule. In such cases, the flow processor 855 matches the packets against its stored rules. When a packet matches a rule, the flow processor 825 sends the matched rule and the packet to the managed bridge 860 for the managed bridge to process. This way, when the managed bridge 860 subsequently receives a similar packet that matches the generated rule, the packet will be matched against the generated exact match rule in the managed bridge and the flow processor 855 will not have to process the packet.

In some embodiments, the virtual switch database daemon 830 is an application that also communicates with the physical controller 895 in order to configure the virtual switching element (e.g., the virtual switch daemon 825 and/or the virtual switch kernel module 840). For instance, the virtual switch database daemon 830 receives configuration information from the physical controller and stores the configuration information in a set of database tables 845. This configuration information may include tunnel information for creating tunnels to other managed forwarding elements, port information, etc. In some embodiments, the virtual switch database daemon 830 communicates with the network controller 895 through a database communication protocol. In some cases, the virtual switch database daemon 830 may receive requests for configuration information from the virtual switch daemon 825. The database daemon 830, in these cases, retrieves the requested configuration information (e.g., from its set of database tables 845) and sends the configuration information to the virtual switch daemon 825.

As shown, the virtual switch database daemon 830 includes a configuration retriever 865 and a set of database tables 845 (which may be stored, e.g., on a hard drive or other storage of the host 800). The configuration retriever 865 is responsible for communications with the physical controller 895. In some embodiments, the configuration retriever receives the configuration information for the virtual switch from the controller. In addition, the configuration retriever in some embodiments receives the data tuples describing the logical service node and DHCP configuration. The configuration retriever 865 also converts these data tuples into database table records to store in the database tables 845.

Specifically, the database tables 845 of some embodiments include a container table, with each record in the database defining a different namespace (or other container) on the host machine. Thus, for the host 800, the container table would include a row for each of the two namespaces 810 and 815. In some embodiments, these rows each include columns for DHCP options to apply globally within the DHCP service, as well as a configuration column that stores the enable/disable status of various services that may exist in the namespace (e.g., DHCP, metadata proxy, etc.). When the configuration retriever 865 receives a modified data tuple indicating that the DHCP service should be enabled for a particular logical service node, the configuration retriever modifies the database tables 845 to set the DHCP enabled status to true for the namespace that implements the logical service node.

The database tables 845, in some embodiments, also include a table for each logical switch, which may be treated as a subnet (as the DHCP module may not be aware of the concept of a logical switch). Each interface of a logical service node is assigned a row in the database tables, which stores the DHCP options (as key-value pairs) and the interface ID to which these options apply. In addition, the database tables 845 of some embodiments include a table that stores the configuration for the VMs or other entities (e.g., physical hosts) serviced by the DHCP service. This table includes a row for each VM or other host, with each row including (i) the MAC address of the VM/host (ii) the IP address assigned to the VM/host, (iii) the DHCP options (again as key-value pairs) to apply to the VM/host, and the interface through which the logical service node (and therefore the DHCP service) receives requests from the VM/host. Because the table includes a column for the interface, a single table can store information for all of the hosts serviced by a particular logical service node, even if those hosts are on multiple different logical switches (and therefore assigned to different interfaces).

The virtual switch kernel module 840 processes and forwards network data (e.g., packets) between the namespaces running on the host 800 and network hosts external to the host 800 (e.g., network data received through the NIC 870). In some embodiments, the virtual switch kernel module 840 implements the forwarding tables of the physical control plane for one or more logical networks (specifically, the logical networks to which the namespaces 810 and 815 belong). To facilitate the processing of network data, the virtual switch kernel module 840 communicates with virtual switch daemon 825 (e.g., to receive flow entries from the flow processor 855).

FIG. 8 illustrates that the virtual switch kernel module 845 includes a managed bridge 860. In addition, in some embodiments, the virtual switch kernel module may include additional bridges, such as an integration bridge and physical interface (PIF) bridges. Some embodiments include a PIF bridge for each NIC 870 in the host machine's hardware. In this case, in some embodiments a PIF bridge is located between the managed bridge 860 and the NIC 870.

The managed bridge 860 of some embodiments performs the actual processing and forwarding of the packets between the namespaces 810 and 815 and the VMs and other hosts that communicate with the namespaces. Packets are received at the managed bridge 860 from the external sources through tunnel ports, such that packets arriving over different tunnels are received at different interfaces of the bridge 860. Based on the destination logical port appended to the packet (or other information, such as a destination MAC or IP address, etc.), the managed bridge 860 sends the packet to the appropriate namespace through its interface with the namespace. Similarly, the managed bridge receives packets from the namespaces 810 and 815, and processes and forwards these packets using the interface through which the packets are received and destination addresses of the packets. In some embodiments, to process the packets, the managed bridge 860 stores a subset of the rules stored in the flow processor 855 (and/or rules derived from rules stored in the flow processor 855) that are in current or recent use for processing the packets.

Although FIG. 8 illustrates one managed bridge, the virtual switch kernel module 840 may include multiple managed bridges. For instance, in some embodiments, the virtual switch kernel module 840 includes a separate bridge for each logical network that is implemented within the host machine 800, or for each namespace residing in the host (which will often be the same as each logical network).

Each of the namespaces 810 and 815 implements a different logical service node. The namespaces may be an active or a standby implementation of their logical service node, although in some embodiments the namespace is not aware of its status as active or standby. As described below, the tunnels on the VM hosts are managed such that packets will always be sent to the active logical service node implementation. As such, the standby implementations operate as though active, but should not receive any traffic. As indicated in this figure, different namespaces implementing different logical service nodes for different logical networks (or for the same logical network) may reside on the same host 800 in some embodiments. As a result, different DHCP server instances providing DHCP service for different logical networks may reside on the same host 800.

The logical service nodes may provide multiple services. In this case, both of the namespaces 810 and 815 include DHCP modules 875 and 880, respectively, as well as other services 885 and 890. In some embodiments, the DHCP modules 875 and 880 are instances of a commonly available DHCP server, such as Linux's dhcp daemon (dhcpd). Other embodiments use different DHCP modules to provide DHCP service within the namespace. The other services 885 and 890 may differ between two namespaces. For example, one of the logical service nodes might be configured to provide metadata proxy, while the other logical service node is configured to provide DNS. In addition, some embodiments provide DHCP relay service, though some such embodiments do not allow DHCP relay service and DHCP service in the same logical service node.

The DHCP modules 875 and 880 provide DHCP service according to defined configurations. As described below, in some embodiments the namespace daemon 835 generates configuration files 892 for these modules and stores the configuration files in the host file system 820 (e.g., in a pre-specified directory of the file system). The DHCP modules 875 and 880 access their respective configuration files in order to process incoming DHCP requests from VMs and other hosts that they service.

The namespace daemon 835 of some embodiments manages the namespaces 810 and 815 residing on the host 800 and the services running in those namespaces (e.g., DHCP service). As shown, the namespace daemon 835 includes a virtual switch database monitor 894 and a DHCP configuration generator 897. In addition, some embodiments include configuration generators or similar modules for other services (e.g., a metadata proxy configuration generator).

The virtual switch database monitor 894 listens on the database tables 845 for changes to specific tables that affect the namespaces implementing logical service nodes. These changes may include the creation of a new namespace, removal of a namespace, enabling a new service within a particular namespace, creating or modifying a DHCP configuration (or other service configuration), etc. When the virtual switch database monitor 894 detects a change that affects the namespaces, it either causes the namespace daemon to create a new namespace on the host for a new logical service node, instantiate a process in an existing namespace for a newly enabled service, or generate/modify a configuration file for an existing service.

When DHCP configuration data is retrieved by the monitor 894, the DHCP configuration generator 897 generates or modifies a configuration file for the DHCP process. To generate a configuration file, the DHCP configuration generator stores methods for parsing the retrieved database tables 845 and writing this information to a file in a format readable by the DHCP module. In some embodiments, the configuration generator 897 writes data to a text file in a meta language. This text file contains MAC address to IP address bindings (i.e., for VMs or other hosts), subnet (i.e., logical switch)-specific settings, global settings, etc. For instance, although the database tables are defined in terms of interfaces that correspond to logical switches in some embodiments, the DHCP module may have no conception of either the logical interface of the logical service node or of the logical switch. Accordingly, some embodiments treat each logical switch as an IP subnet, a format readable by the DHCP module.

Figure 11:
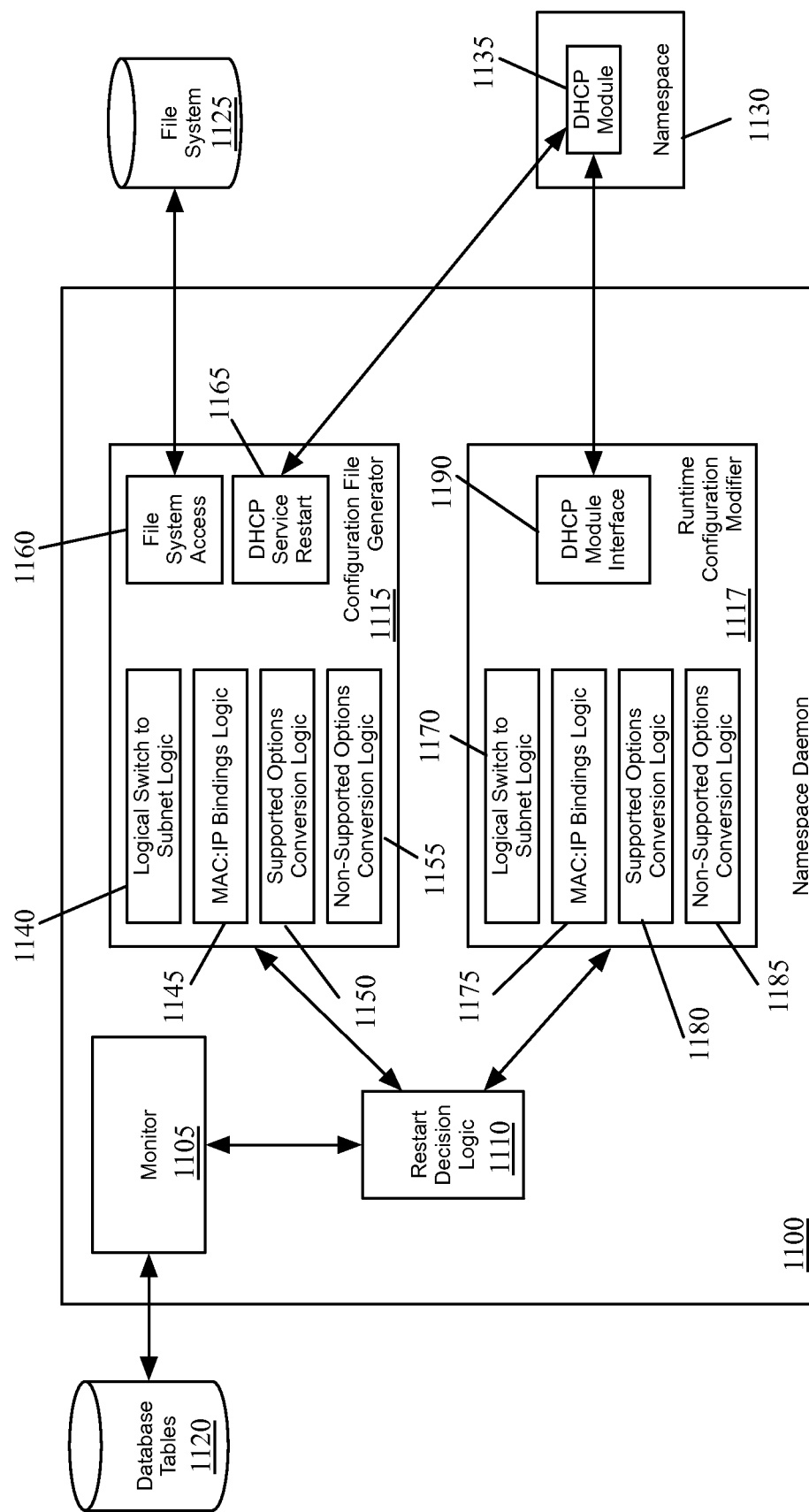
FIG. 11 conceptually illustrates a namespace daemon of some embodiments.

In addition, some of the specified DHCP options may not be supported by the DHCP modules 875 and 880. For an unsupported specified option, some embodiments use a predetermined formula to write a series of statements (e.g., a combination of supported options) into the configuration file in order to arrive at the functional equivalent of the specified option. For supported options, the DHCP configuration generator 897 writes the option and its value into the configuration file associated with the correct entity (a subnet, a particular MAC address, etc.). The configuration generator of some embodiments will be described in further detail below by reference to FIG. 11.

After generating a new configuration file, the namespace daemon 835 of some embodiments stores the configuration file in the file system 820, possibly overwriting an existing configuration file for the DHCP module. In addition, after changes to the configuration file, some embodiments issue a command to restart the DHCP module, thereby allowing the module to pick up the new configuration. In addition, for smaller changes to the DHCP configuration, some embodiments use a different method to directly modify the configuration of the running DHCP module, that does not require a restart.

Figure 9:
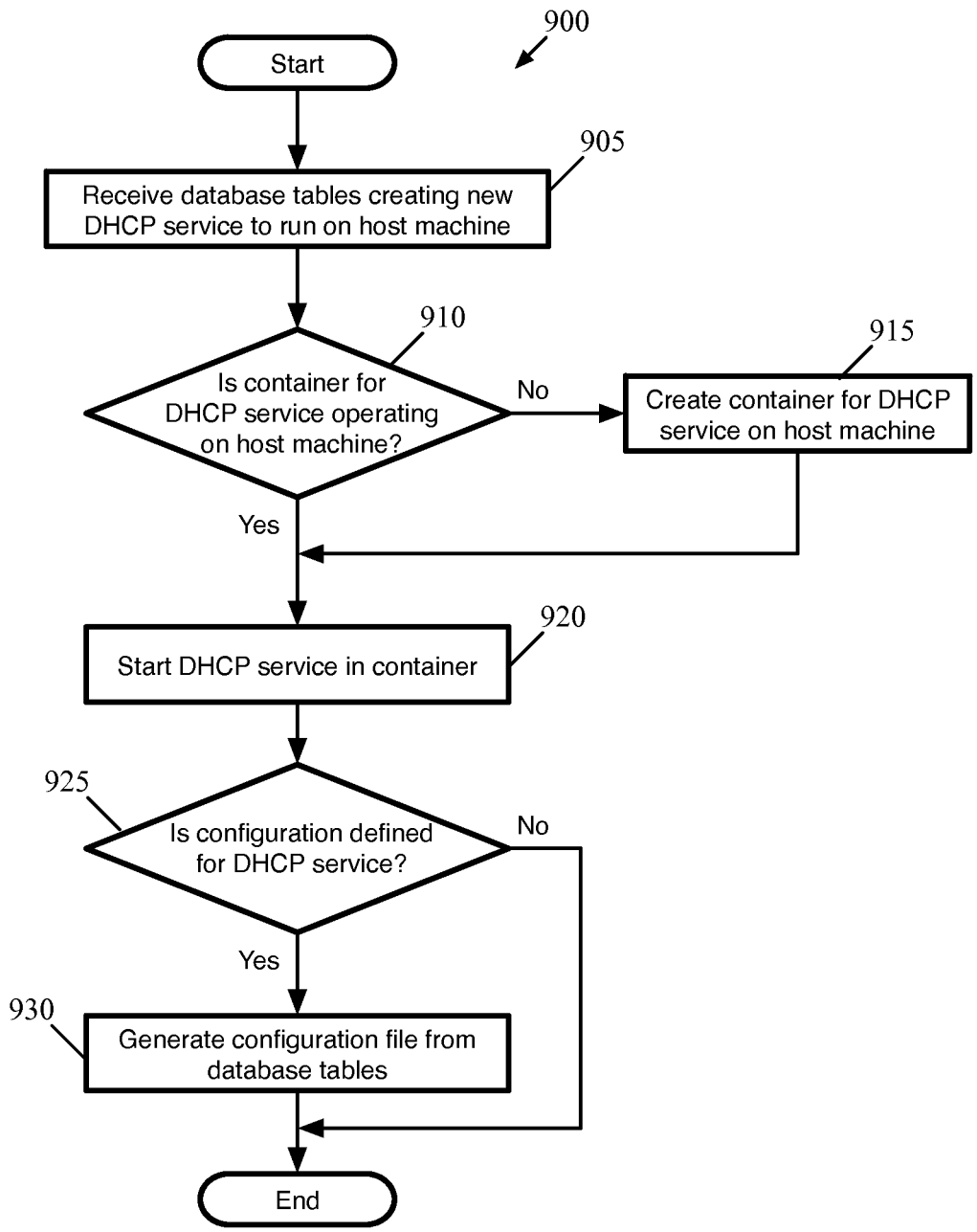
FIG. 9 conceptually illustrates a process of some embodiments for starting up a new DHCP service on a logical service node host.

Certain operations of the namespace daemon 835 will now be described by reference to FIGS. 9 and 10. FIG. 9 conceptually illustrates a process 900 of some embodiments for starting up a new DHCP service on a LSN host (e.g., the host 800). As shown, the process 900 begins by receiving (at 905) database tables (or table records) creating a new DHCP service to run on a host machine. As described above, the namespace daemon may listen for changes to certain database tables stored on the host, in order to identify actions it needs to take regarding the DHCP processes, including creating or removing namespaces, instantiating DHCP processes, modifying configuration files, etc.

The process 900 determines (at 910) whether the container for the DHCP service is yet operating on the host machine. When the modified database tables include a new row for a new namespace that contains the enabled DHCP service, then the container will not yet be operating. In this case, the process creates (at 915) a container for the DHCP service on the host machine. As indicated, in some embodiments this container is a namespace, which is a lightweight (less computationally intensive) container (e.g., as compared to a virtual machine). Like VMs, namespaces are virtualizations that can share virtualized hardware resources with other virtualization (e.g., other namespaces, VMs).

After the container is created, or if the container has already been created, the process 900 starts (at 920) the DHCP service in the container. This may involve the namespace daemon sending a command to the namespace to instantiate a DHCP module (e.g., dhcpd). This causes the DHCP module to start, but without a configuration, the DHCP module will not actually provide any useful service.

The process next determines (at 925) whether a configuration is defined for the DHCP service. This determination specifically identifies whether database tables defining any configuration for the DHCP service exist. In some embodiments, even if the user provides a configuration at the same time as they initiate the logical network with the logical service node, the namespace daemon may receive the database tables defining the existence of the logical service node before the configuration. When no configuration is yet defined for the DHCP service, the process ends. When a configuration is defined, the process 900 generates (at 930) a configuration file for the DHCP service from the database tables that define the configuration, then ends. The generation of a configuration file will be described in greater detail below by reference to FIGS. 11 and 12.

This process 900 describes the operations of the namespace daemon of some embodiments to create a new DHCP service. One of ordinary skill in the art will recognize that the virtual switch daemon and the virtual switch kernel module, in some embodiments, also perform operations in order to create the forwarding tables used to forward packets to and from the newly created namespace.

Figure 10:
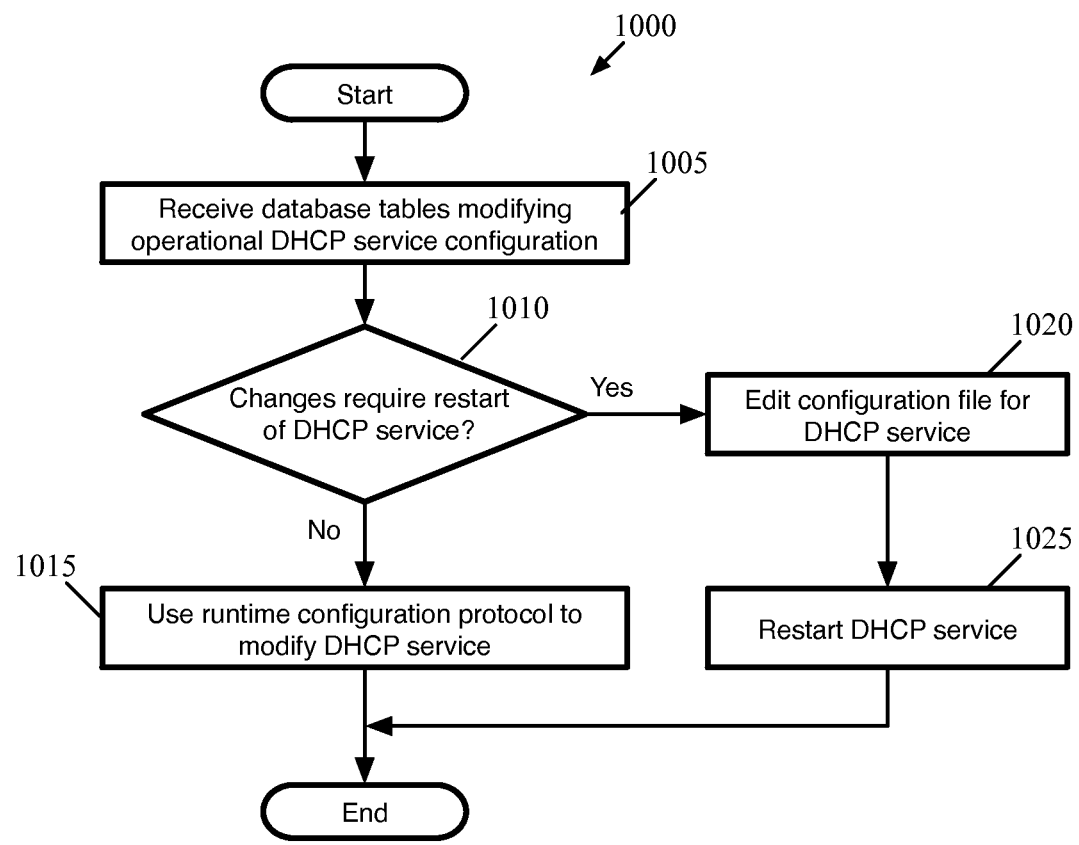
FIG. 10 conceptually illustrates a process of some embodiments for modifying an existing DHCP configuration of an operating DHCP module.

FIG. 10 conceptually illustrates a process 1000 of some embodiments for modifying an existing DHCP configuration of an operating DHCP module. In some embodiments, the process 1000 is performed by a namespace daemon (e.g., daemon 835) to modify a DHCP configuration for a module operating in a namespace (e.g., DHCP module 875). As shown, the process begins (at 1005) by receiving (at 1005) database tables (or table records) that modify an operational DHCP service configuration. As described above, the namespace daemon may listen for changes to certain database tables stored on the host, in order to identify actions it needs to take regarding the DHCP processes. This includes identifying modifications to existing tables and existing table records that modify the configuration for a DHCP service.

The process 1000 determines (at 1010) whether the identified changes require a restart of the DHCP service. In effect, this is a determination as to whether the changes can be made at runtime. In some embodiments, whether to perform changes at runtime requires a decision by the developer (e.g., of the namespace daemon). As making changes at runtime is more convenient but requires significantly more development time, some embodiments perform smaller, more common changes by directly accessing the running DHCP module and modifying its configuration at runtime. However, for larger and less common changes the namespace daemon modifies the configuration file and then restarts the DHCP module.

When the changes do not require a restart, the process uses (at 1015) a runtime configuration protocol to modify the DHCP service configuration, then ends. In some embodiments, the namespace daemon uses Object Management API (OMAPI), which allows for the manipulation of an internal data structure of certain DHCP servers (e.g., dhcpd), to make runtime changes to the DHCP module. As mentioned, some embodiments only make smaller changes to the DHCP configuration at runtime. In some embodiments, these changes include the addition, modification, or removal of individual VMs or other hosts (e.g., an addition, removal, or modification of an entry in the host database table). Modification to the settings for a VM could include the modification of its IP address, or changing the DHCP options for the VM. In addition to directly modifying the running service, some embodiments also modify the configuration file in order to keep the file up to date (e.g., in case of a crash and necessary restart).

On the other hand, when the changes can not be performed at runtime and therefore require a restart of the DHCP service, the process 1000 edits (at 1020) the configuration file for the DHCP service and restarts (at 1025) the service. After restarting the service, the process ends. In some embodiments, the namespace daemon makes larger and less common changes to the service offline. For instance, some embodiments modify the configuration file, then restart, for any changes to global (service-wide) options or to options for a specific port of the DHCP service (i.e., for all hosts of a specific logical switch). In addition, the addition or removal of a logical switch attachment to the DHCP service requires a restart in some embodiments. One of ordinary skill will recognize that the division between when to restart and when to directly modify the configuration is a developer or administrator choice, and can be modified in different embodiments. For example, some embodiments would not restart for modifications to per logical switch options, or would even perform all changes at runtime.

In some embodiments, when restarting, the namespace daemon for the master logical service node coordinates with the namespace daemon for the backup logical service node to ensure that both the master and the backup are not both restarting at the same time. In other embodiments, the master and backup operate independently.

FIG. 8 above describes a host machine, which includes a DHCP configuration generator 897 that is part of the namespace daemon 835. The following FIG. 11 conceptually illustrates a namespace daemon 1100 of some embodiments in greater detail. Specifically, this figures illustrates in further detail the features of the DHCP configuration generator 897.

As shown, the namespace daemon 1100 includes a monitor 1105, restart decision logic 1110, a configuration file generator 1115, and a runtime configuration modifier 1117. In some embodiments, the restart decision logic 1110, configuration file generator 1115, and runtime configuration modifier 1117 perform the functions of the DHCP configuration generator 897. One of ordinary skill in the art will recognize that the namespace daemon of some embodiments may include additional or different modules, such as configuration generators for other services besides DHCP.

The monitor 1105, as described above by reference to FIG. 8, monitors the database tables 1120 to identify changes to the DHCP configuration for any logical service nodes operating as namespaces on the host machine. In some embodiments, the monitor additionally monitors tables relating to other services (e.g., metadata proxy). The database tables 1120, in some embodiments, include tables that define each logical service node as a container (e.g., namespace 1130) and the services enabled in the container (e.g., DHCP, DNS, metadata proxy, etc.), the logical switches that attach to the logical service node, MAC to IP bindings for the serviced VMs and other hosts, DHCP options (global, per logical switch, and per VM options), etc. These database tables 1120 are stored in a specific format (e.g., OVSdb) in some embodiments. In some embodiments, this format is the same as that used for other configuration data for the host machine, such as the managed forwarding element configuration (e.g., port and tunnel information, etc.).

The monitor 1105, in some embodiments, periodically checks the database tables 1120 for updates that affect the DHCP configuration. In other embodiments, the monitor is automatically notified every time the database tables are updated, and the monitor 1105 then queries the tables 1120 for updates.

The restart decision logic 1110 of some embodiments receives configuration information (e.g., database table records identified by the monitor 1105) for one of the DHCP services operating on the host (e.g., the DHCP module 1135) and determines whether to update the DHCP service by using a runtime configuration protocol or by modifying the configuration file for the service and then restarting the service. Newly created namespaces or DHCP services will not use the runtime configuration protocol. However, for modifications to existing DHCP services, different embodiments have different breakdowns between changes that require restarting the DHCP module and changes that can be performed at runtime.

Some embodiments only make smaller changes to the DHCP configuration at runtime. In some embodiments, these changes include the addition, modification, or removal of individual VMs or other hosts (e.g., an addition, removal, or modification of an entry in the host database table). Modification to the settings for a VM could include the modification of its IP address, or changing the DHCP options for the VM.

Some embodiments make larger changes to the running DHCP service offline. For instance, some embodiments modify the configuration file, then restart the service, for any changes to global (service-wide) options or to options for a specific port of the DHCP service (i.e., for all hosts of a specific logical switch). Furthermore, the addition or removal of a logical switch attachment to the DHCP service requires a restart in some embodiments. One of ordinary skill will recognize that the division between when to restart and when to directly modify the configuration is a developer or administrator choice, and can be modified in different embodiments. For example, some embodiments would not restart the service for modifications to per logical switch options.

When the restart decision logic 1110 determines that the changes require restarting the service, the restart decision logic sends the changes (e.g., the updated database table entries) to the configuration file generator 1115. On the other hand, when the restart decision logic 1110 determines that the changes can be performed at runtime, it sends these updates to the runtime configuration modifier 1117. In some embodiments, the restart decision logic always sends the updates to the configuration file generator 1115, which updates the configuration file even when no restart is required. With all changes to the DHCP configuration tracked in the configuration file, if the namespace or DHCP module crashes, the configuration file need not be updated before restarting. Furthermore, if additional updates are received that do require a restart, only those new updates will need to be edited into the configuration file.

The configuration file generator 1115 of some embodiments contains various logic for converting database table entries that describe a DHCP service into the appropriate configuration file language or meta-language for the DHCP module 1135. In some embodiments, different DHCP modules use different configuration languages or even different types of configuration files. In some embodiments, namespaces run the dhcpd application, which reads its configuration from a specific meta-language written into a text file.

In this example, the configuration file generator 1115 includes logical switch to subnet logic 1140, MAC:IP bindings logic 1145, supported options conversion logic 1150, and non-supported options conversion logic 1155. One of ordinary skill in the art will recognize that different embodiments may perform various different or additional conversions from database table entries to configuration file data. The logical switch to subnet logic 1140, in some embodiments, defines a subnet or group for a specific interface of the namespace. In some embodiments, logical switches each attach to a separate interface of the logical service node implemented by a namespace, as shown in FIG. 1. However, many DHCP modules are not aware of the logical switch concept, and instead view them as subnets or groups. Therefore, for each interface defined as belonging to the particular namespace in a database table entry, some embodiments define a group, or subnet, in the configuration file.

The MAC:IP bindings logic 1145 of some embodiments defines each VM on each logical switch serviced by a particular DHCP module (e.g., module 1135). Each VM or other host belongs to a particular logical switch, for which a group/subnet has been defined in the configuration file. The logic 1145 of some embodiments defines each VM within the configuration, and declares the MAC address and IP address assigned to the VM (if both are available) within the definition of the VM. For static DHCP, the IP address is declared as a fixed address in some embodiments.

The configuration file generator 1115 contains both supported options conversion logic 1150 and non-supported options conversion logic 1155. DHCP options are optional configuration parameters that may be provided to a DHCP client (i.e., a VM or other host). These options fall into various categories, such as various vendor extensions (which, e.g., provide information about available servers of various types (DNS servers, time servers, etc.), available routers, domain names, etc.), IP layer parameters (e.g., MTU size, default time to live, static routes, etc.), link layer and TCP parameters, application and service parameters (e.g., default servers for specific applications or protocols), and DHCP extensions (e.g., renewal time, lease time, etc.). In some embodiments, the DHCP options may be specified on a global basis (i.e., for all subnets or groups), a per logical switch basis (i.e., for all hosts in a specific subnet/group), or on a per host basis. RFC 2132, which specifies many of the DHCP options, is available at http://tools.ietf.org/html/rfc2132, and is incorporated herein by reference.

In some embodiments, the DHCP module does not support all DHCP options. If a specified option is supported, then the configuration file generator 1115 uses supported options conversion logic 1150 to define the specified option in the configuration file. When a supported DHCP option is specified in the database table entry for a particular logical service node (and therefore a particular DHCP service), the conversion logic 1150 defines the option globally in the configuration file. This option will then be provided by the DHCP module to any VM requesting an IP address on any of the namespace interfaces. When a supported DHCP option is specified in the database table entry for a particular logical switch, the conversion logic 1150 defines the option within the specification of the group/subnet to which the particular logical switch corresponds. This option will then be provided by the DHCP module to any VM requesting an IP address on that particular interface. Finally, when a database table entry for a VM specifies a supported DHCP option, the conversion logic 1150 defines the option within the specification of the VM.

For an option not supported by the DHCP module (whether the option is defined globally, for a specific logical switch, or for a specific host), the non-supported option conversion logic 1155 stores a set of operations for converting the specified option to supported features. In some embodiments, the process first defines the option as a new type of option within the configuration file and then writes into the configuration the specific value for the option. In some embodiments, one option may be written in terms of various supported options with values determined based on the value specified for the non-supported feature.

One example of an option that might not be supported in some embodiments is the classless-static-routes option, which may be used to configure a VM routing table with static routes. For a DHCP module that does support this option, the configuration file might read "option classless-static-routes 192.168.35.0/24 10.20.0.1, which would instruct the VM to forward packets for 192.168.35.0/24 through the router at 10.20.0.1.

However, some embodiments do not support this option, and thus the option from the database tables is converted to first define "option classless-static-routes code 121=array of integer 8;". This statement defines a new option "classless-static-routes" that uses a code 121 and the value of which is an array of 8 bytes. Next, the specific requested option is written into the configuration file as "option classless-static-routes=24, 192, 168, 35, 10, 20, 0, 1. Based on the DHCP option RFC that defines this option, the configuration file instructs the DHCP module to put these exact bytes into the packet as the value of the option with code 121, which will be understood by the receiving VM. Thus, for any option, the configuration file generator first defines the option in the configuration file along with an option code, then defines for the DHCP module exactly how to specify the desired value in a DHCP offer or acknowledgment packet.

Figure 12:
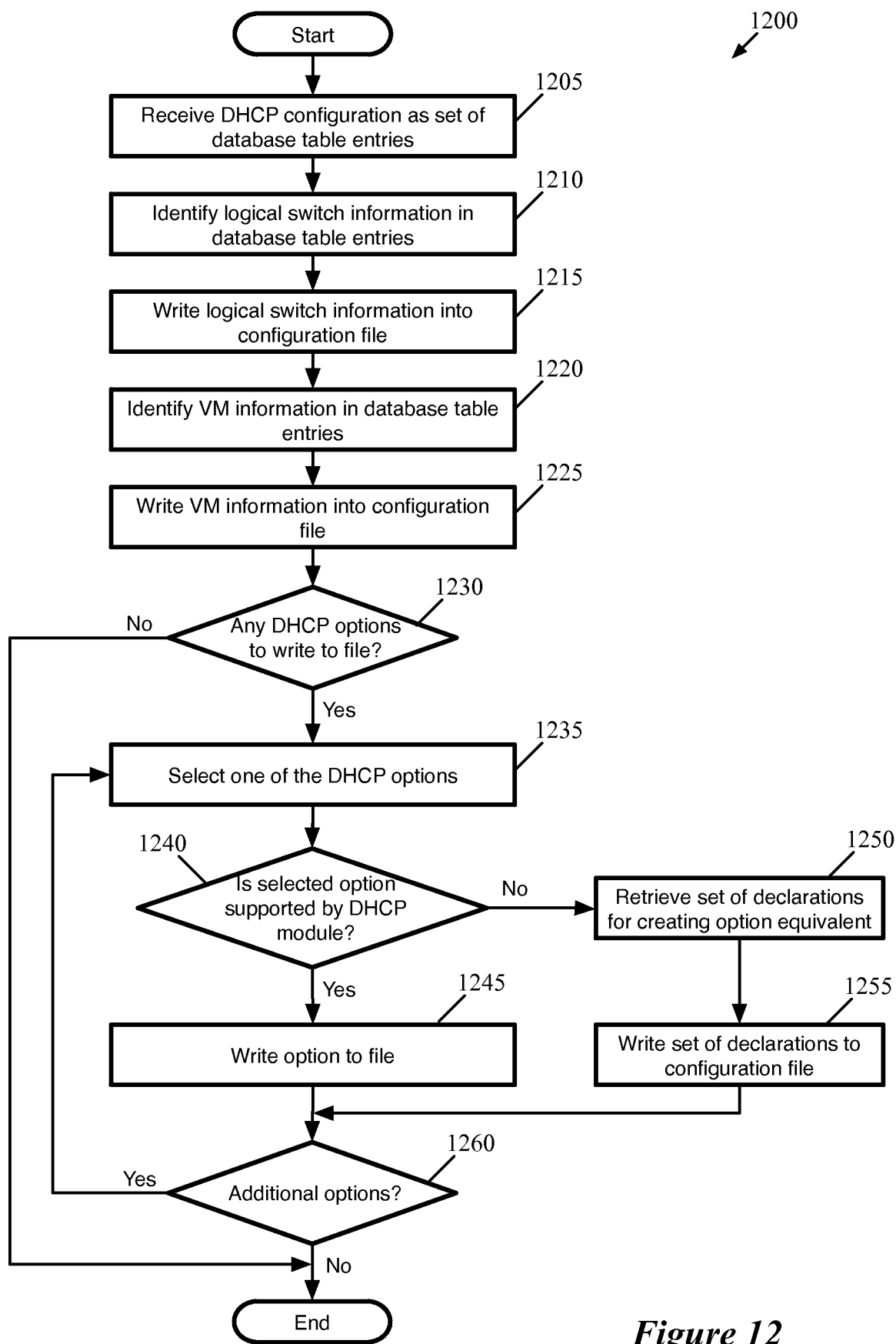
FIG. 12 conceptually illustrates a process of some embodiments for generating a configuration file for a DHCP module based on a set of database table entries defining a DHCP configuration.

The configuration file generator 1165 also includes a file system accessor 1160 and a DHCP service restarter 1165. The file system accessor 1160 enables the configuration file generator 1165 to access the host machine's file system, and stores the configuration file generated using the various conversion logic modules 1140-1155 to the appropriate directory in the file system. FIG. 12, described below, conceptually illustrates a process for generating a configuration file.

The DHCP service restarter 1165 is responsible for communicating with the DHCP modules operating in the namespaces (e.g., module 1135 in namespace 1130) on the host machine in order to restart the DHCP modules. When the DHCP application or daemon that implements the DHCP service restarts, it reads in a configuration from a configuration file in a particular directory. Therefore, after the file system accessor 1160 writes an updated configuration file for a particular DHCP service to the file system 1125 after larger changes to the configuration, the restarter 1165 effects a restart of the particular DHCP service. However, when the changes to the configuration file mirror those made directly to the running DHCP module through the runtime configuration modifier 1117, then the restarter 1165 does not restart the DHCP service.

When the runtime configuration modifier 1117 receives updates to a DHCP configuration, the configuration modifier directly modifies the configuration of the corresponding operating DHCP module (e.g., module 1135). In some embodiments, the operating DHCP module instantiates objects for each group/subnet and for each host declared in the configuration file. The runtime configuration modifier 1117 of some embodiments modifies these objects (e.g., through the Object Management API (OMAPI)).

As with the configuration file generator 1115, the runtime configuration modifier 1117 includes logical switch to subnet logic 1170, MAC:IP bindings logic 1175, supported options conversion logic 1180, and non-supported options conversion logic 1185. Whereas the logic 1140-1155 converts database table entries into configuration file metalanguage, the logic 1170-1185 provides instructions to the DHCP module interface 1190 as to how to modify the instantiated objects of the DHCP module 1135. For instance, for embodiments that add or remove logical switches through runtime modification, the logical switch to subnet logic 1170 provides instructions regarding a group/subnet object to add or remove. The MAC:IP bindings logic 1175, in some embodiments, provide instructions regarding host objects to modify, add, or remove. Similarly, the options logic 1180 and 1185 provides instructions regarding the modification, addition, and removal of options from the group/subnet objects, the host objects, or the global definitions. The DHCP module interface 1190 is responsible for communicating with the DHCP modules (e.g., module 1135) to modify the objects (e.g., using OMAPI).

As mentioned, FIG. 12 conceptually illustrates a process 1200 of some embodiments for generating a configuration file for a DHCP module (e.g., for dhcpd) based on a set of database table entries defining a DHCP configuration. While this process illustrates the generation of a new configuration file, one of ordinary skill will recognize that a similar process with similar operations would be performed to modify an existing configuration file. In some embodiments, the process is performed by a namespace daemon such as daemon 1100 (e.g., by the configuration file generator 1115 in response to the monitor 1105 identifying a new DHCP configuration).

The process 1200 begins (at 1205) by receiving a DHCP configuration as a set of database table entries. As described above, these database table entries may include entries for the namespace itself (enabling DHCP in a namespace), entries for logical switches, and entries for VMs and other hosts (which the DHCP service simply views as a host, irrespective of whether the host is a VM or other entity). Assuming DHCP is enabled for a particular namespace, the namespace daemon will generate a configuration file based on the other data for the DHCP service.

The process 1200 identifies (1210) logical switch information in the database table entries, and writes (at 1215) the logical switch information into the configuration file (e.g., as a subnet or group). In some embodiments, logical switches each attach to a separate interface of the logical service node implemented by a namespace, as shown in FIG. 1. However, many DHCP modules are not aware of the logical switch concept, and instead view them as subnets or groups. Therefore, for each interface defined as belonging to the particular namespace in a database table entry, some embodiments define a group, or subnet, in the configuration file. Each group is defined as including a range of IP addresses, in some embodiments.

Next, the process identifies (at 1220) VM or other host information in the database table entries, and writes (at 1225) the VM information into the configuration file (e.g., as hosts). Each VM or other host belongs to a particular logical switch, for which a group/subnet has been defined in the configuration file. Some embodiments define each VM within the configuration, and declare the MAC address and IP address assigned to the VM (if both are available) within the definition of the VM. For static DHCP, the IP address is declared as a fixed address in some embodiments.

The process 1200 also deals with writing the options into the configuration file. One of ordinary skill in the art will recognize that, while shown separately from the logical switch and VM definitions, in some embodiments the configuration file generator converts the options for a particular logical switch as part of operation 1215, and the options for a particular VM as part of operation 1225.

In this case, the process 1200 determines (at 1230) whether there are any DHCP options to write to the configuration file. These options fall into various categories, such as various vendor extensions (which, e.g., provide information about available servers of various types (DNS servers, time servers, etc.), available routers, domain names, etc.), IP layer parameters (e.g., MTU size, default time to live, static routes, etc.), link layer and TCP parameters, application and service parameters (e.g., default servers for specific applications or protocols), and DHCP extensions (e.g., renewal time, lease time, etc.). In some embodiments, the DHCP options may be specified on a global basis (i.e., for all subnets or groups), a per logical switch basis (i.e., for all hosts in a specific subnet/group), or on a per host basis. When the configuration does not specify any options, the process ends.

When the configuration does specify at least one option, the process 1200 selects (at 1235) one of the DHCP options. Some embodiments select the option based on the order in which the database table entries are received. In some embodiments, the namespace daemon first converts the global options, then the per logical switch options, then finally the host-specific options. In some embodiments, the options are converted and written into the configuration file along with their respective object (e.g., a group or a host). When an option is specified in a row that defines a logical switch, the namespace daemon writes that option to the configuration file while defining the logical switch as a group/subnet.

With an option selected, the process determines (at 1240) whether the option is supported by the DHCP module. When the option is supported, the process 1200 writes (at 1245) the option to the configuration file. When a supported DHCP option is specified in the database table entry for a particular logical service node (and therefore a particular DHCP service), the process defines the option globally in the configuration file. This option will then be provided by the DHCP module to any VM requesting an IP address on any of the namespace interfaces. When a supported DHCP option is specified in the database table entry for a particular logical switch, the process defines the option within the specification of the group/subnet to which the particular logical switch corresponds. This option will then be provided by the DHCP module to any VM requesting an IP address on that particular interface. Finally, when a database table entry for a VM specifies a supported DHCP option, the process defines the option within the specification of the VM.

When the option is not supported by the DHCP module, the process 1200 retrieves (at 1250) a set of declarations for creating an equivalent to that option, and writes (at 1255) the set of declarations to the configuration file. This set of declarations may include, e.g., various other options that are supported by the DHCP module. In some embodiments, for any non-supported option, the configuration file generator first defines the option in the configuration file along with an option code, then defines for the DHCP module exactly how to specify the desired value in a DHCP offer or acknowledgment packet.

After writing the option to the configuration file, the process determines (at 1260) whether any additional options remain to write to the file. When additional options remain, the process returns to 1235 to select another of the DHCP options. Otherwise, the process ends.

III. DHCP Processing

The previous sections describe the configuration of a DHCP service for a logical network, at both the controller level and the host machine level. Once the DHCP service is configured on one or more logical service node hosts, the various VMs that use that DHCP service can request IP addresses by sending DHCP requests to the LSN hosts.

In some embodiments, the DHCP implementation follows the standard discovery/offer/request/acknowledgement multi-stage process, in the logical network. That is, the requesting VM first broadcasts a DHCP discovery message on its logical switch. The receiving DHCP server then responds by broadcasting a DHCP offer message that includes an offered IP address. Upon receiving this offer, the VM broadcasts a DHCP request, which formally requests the IP address offered by the DHCP server. Lastly, the DHCP server broadcasts an acknowledgment that the IP address has been assigned to that VM.

In traditional networks, DHCP is a broadcast protocol, and several DHCP servers (in addition to other machines on the network) may receive each message (as the messages are all sent as broadcast packets). In some embodiments, the logical networks preserve this broadcast feature, such that the messages are broadcast to all ports of the logical switch on which the requesting VM resides.

Figure 13:
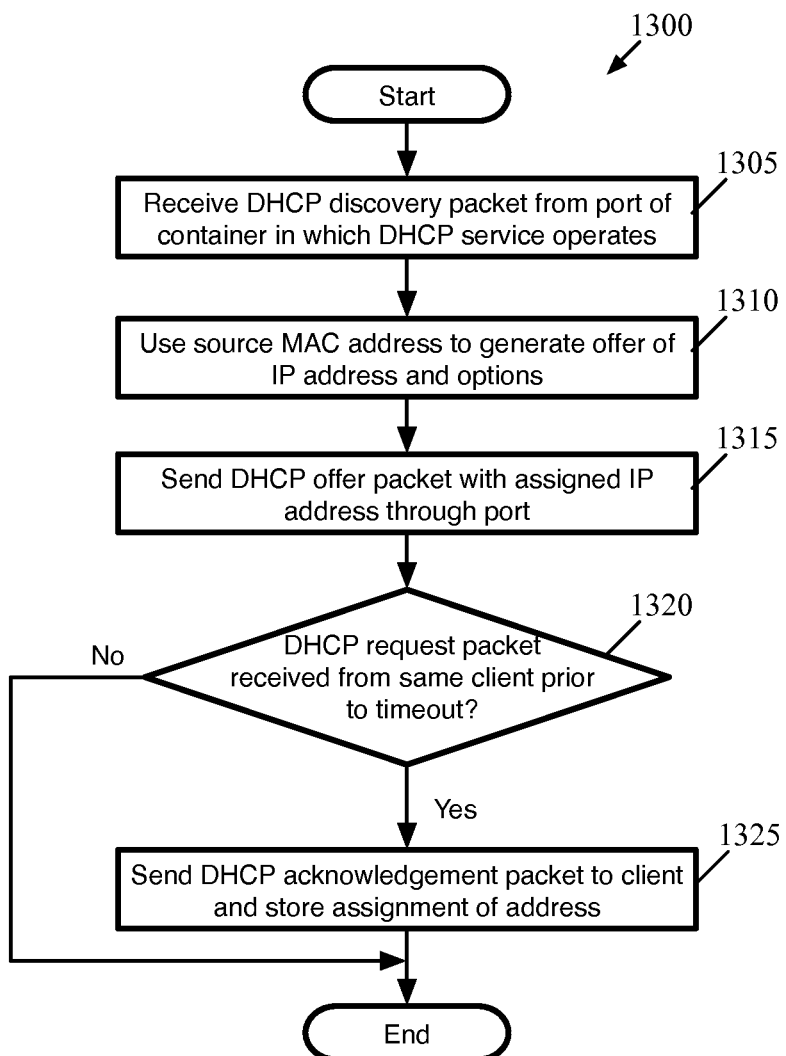
FIG. 13 conceptually illustrates a process of some embodiments performed by a DHCP service in a logical network.

FIG. 13 conceptually illustrates a process 1300 of some embodiments performed by a DHCP service in a logical network (e.g., the DHCP module 875 or 880 from FIG. 8. The DHCP service operates in a namespace or other container that implements a logical service node in some embodiments, as explained in the above sections. The process 1300 will be described in part by reference to FIG. 14, which illustrates a logical network 1400, its implementation in a physical network, and a DHCP discovery packet sent by one of the VMs of the logical network.

As shown, the process 1300 begins by receiving (at 1305) a DHCP discovery packet from a particular port of the container on which the DHCP module operates. A logical service node with DHCP enabled may serve several different logical switches in some embodiments, and each logical switch attaches to a different port of the logical service node. In some embodiments, each of these ports is assigned a different MAC address and IP prefix (e.g., corresponding to the IP prefix used for the VMs on the logical switch to which it attaches). The DHCP module receives a DHCP discovery packet through one of these ports, and for subsequent messages, the traffic is sent through this port.

Figure 14:
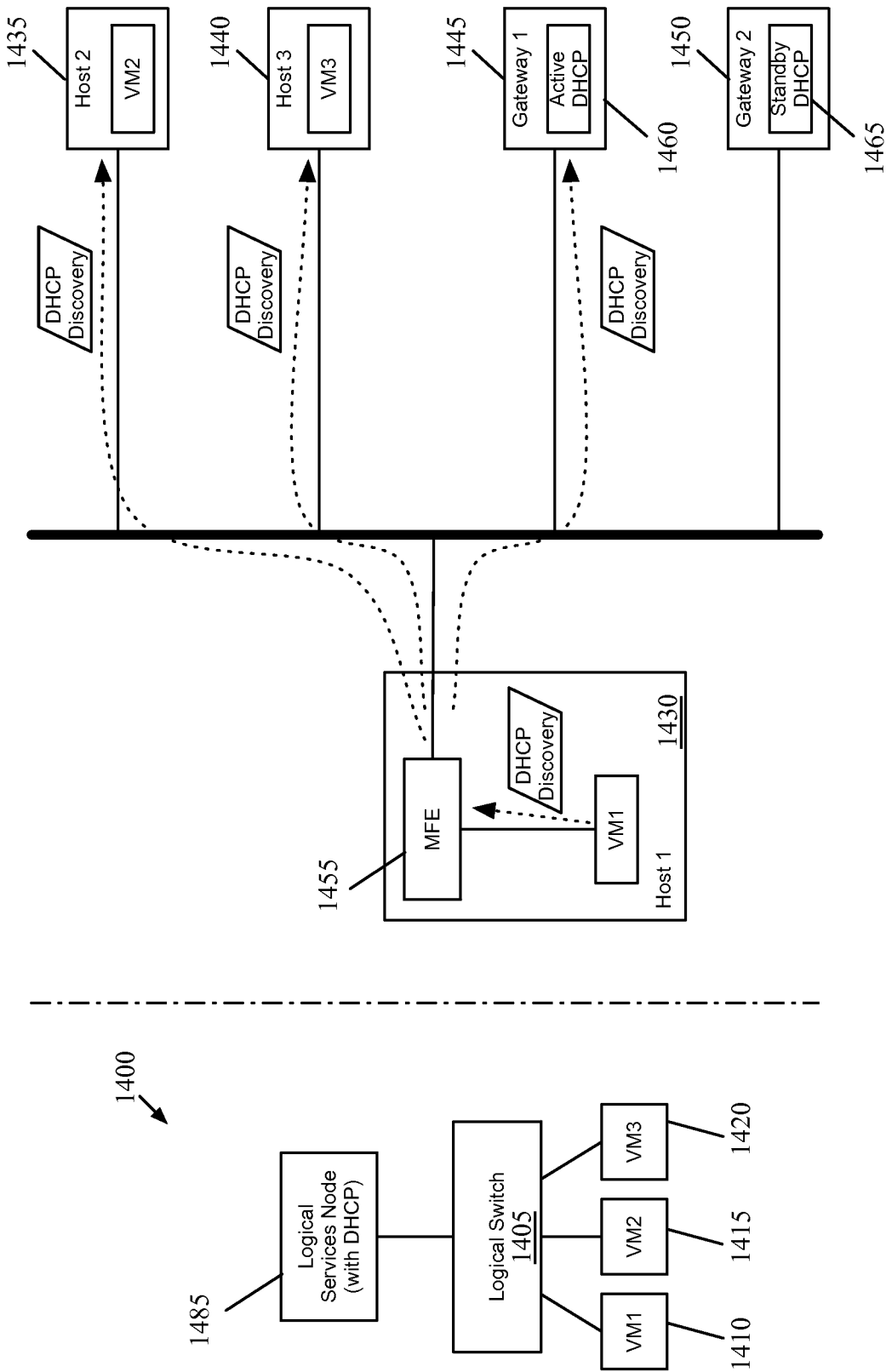
FIG. 14 illustrates a logical network, its implementation in a physical network, and a DHCP discovery packet sent by one of the VMs of the logical network.

FIG. 14 conceptually illustrates a VM sending a DHCP discovery message onto an implementation of a logical network 1400. As shown, the logical network 1400 includes a logical switch 1405 with three VMs 1410-1420 attached, as well as a logical service node 1425. The implementation of this logical network, shown on the right side of the figure, includes the three VMs implemented in three different host machines 1430-1440, and the logical services node (shown with just the DHCP module in the figure) implemented in two different logical service node hosts 1445 and 1450, also referred to as gateways in some embodiments.

Each of the hosts 1430-1440, as well as the gateways 1445 and 1450, includes a managed forwarding element that implements the logical switch 1405 (as well as other logical forwarding elements for, e.g., other logical networks), although the figure only illustrates the MFE 1455 in the first host 1430 on which the VM 1410 is implemented.

When the VM 1410 needs an IP address, (e.g., at time of booting up, or when renewing a leased address), the VM sends a DHCP discovery message to the MFE through its virtual interface. In some embodiments, the VM sends this as a broadcast packet. As such, the MFE 1455, implementing the logical switch 1405, forwards packet to all logical ports of the logical switch. Therefore, as shown, the packet is sent to each of the VMs 1415 and 1420 (which will ignore the packet, in some embodiments) through tunnels between the MFE 1455 and the MFEs on the hosts 1435 and 1440.

In addition, the MFE sends this packet to only the active DHCP service 1460 on the gateway 1445 through a tunnel. In some embodiments, the MFE has information for tunneling packets to both of the gateways, as well as information indicating that the logical service node operating on the gateway 1445 is the active gateway. The MFE regularly (e.g., every 5 seconds, 30 seconds, 2 minutes, etc.) sends out keep-alive messages through the tunnel to the MFE at the gateway. So long as responses are received, the MFE 1455 continues sending packets for the logical service node 1425 to the gateway 1445. Only if responses to the keep-alive messages are not received does the MFE send packets for the logical service node 1425 to the gateway 1450.

Returning to FIG. 13, the process 1300 uses (at 1310) the source MAC address of the DHCP discovery packet to generate an offer of an IP address and set of options. In some embodiments, based on the MAC address, the DHCP module identifies the host object, which includes an assigned IP as well as several host-specific options. In addition, the host object refers to a group/subnet object in some embodiments, which itself may include several options for all VMs or other hosts on the logical switch represented by that group. Lastly, the offer includes any global options for all hosts on all logical switches.

The process then sends (at 1315) the generated offer packet with the assigned IP address out through the port of the container from which the discovery packet was received. In some embodiments, the DHCP module stores (e.g., in memory) information regarding from which port a DHCP packet is received, and uses this information when generating a response packet. In other embodiments, the namespace stores this information, and is able to direct the response packet to the correct port. In some embodiments, the DHCP module receives packets directly from the namespace interface by listening on that interface, and therefore knows to which interface a reply should be sent.

After sending the packet, the process 1300 determines (at 1320) whether a DHCP request packet has been received from the same client (i.e., VM or other host machine) prior to a timeout. In some embodiments, the DHCP module sets a time within which a client must request an offered IP address (e.g., 1 second, 5 seconds, etc.). When the DHCP module has not received the request before timeout, the process ends. On the other hand, when the DHCP module receives a request packet from the same source MAC address for the offered IP address, the process sends (at 1325) a DHCP acknowledgment packet to the client and stores the assignment of the address (e.g., with a lease time).

This above example assumes a multi-stage DHCP process. Some embodiments, at least for static DHCP, use a shorter process in which the VM sends a single packet requesting an IP address, and the subsequent response sent by the DHCP module is considered binding. Whereas in traditional networks there might be multiple uncoordinated DHCP servers, in the implementation of some embodiments shown in, e.g., FIG. 2, only one active service is running, and therefore no need exists for the VM to choose the first of several offers.

In the above examples, each logical service node is implemented by two namespaces operating in host machines, with one active and one standby. In other embodiments the logical service nodes are configured in an active/active configuration, in which two (or more) implementations of the logical service node (and DHCP service) are active. In this configuration, the MFE 1455 determines to which of the various active services to send any DHCP message that it receives from VM 1410 (for other VMs residing on the host 1430, the MFE makes similar decisions between the different DHCP services available for the logical networks of those VMs). When traditional multi-stage DHCP is used (i.e., the discovery/offer/request/acknowledgement process), the MFE needs to ensure that each message sent from a particular VM is sent to the same gateway. Thus, in some embodiments, the MFE 1455 performs a hash of the source MAC address of a packet (i.e., the MAC address of the requesting VM) and uses the result of this hash to determine to which of the various active DHCP services the packet should be sent. Other embodiments use other determinations, so long as all messages from one VM go to the same logical service node implementation (i.e., the same gateway).

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
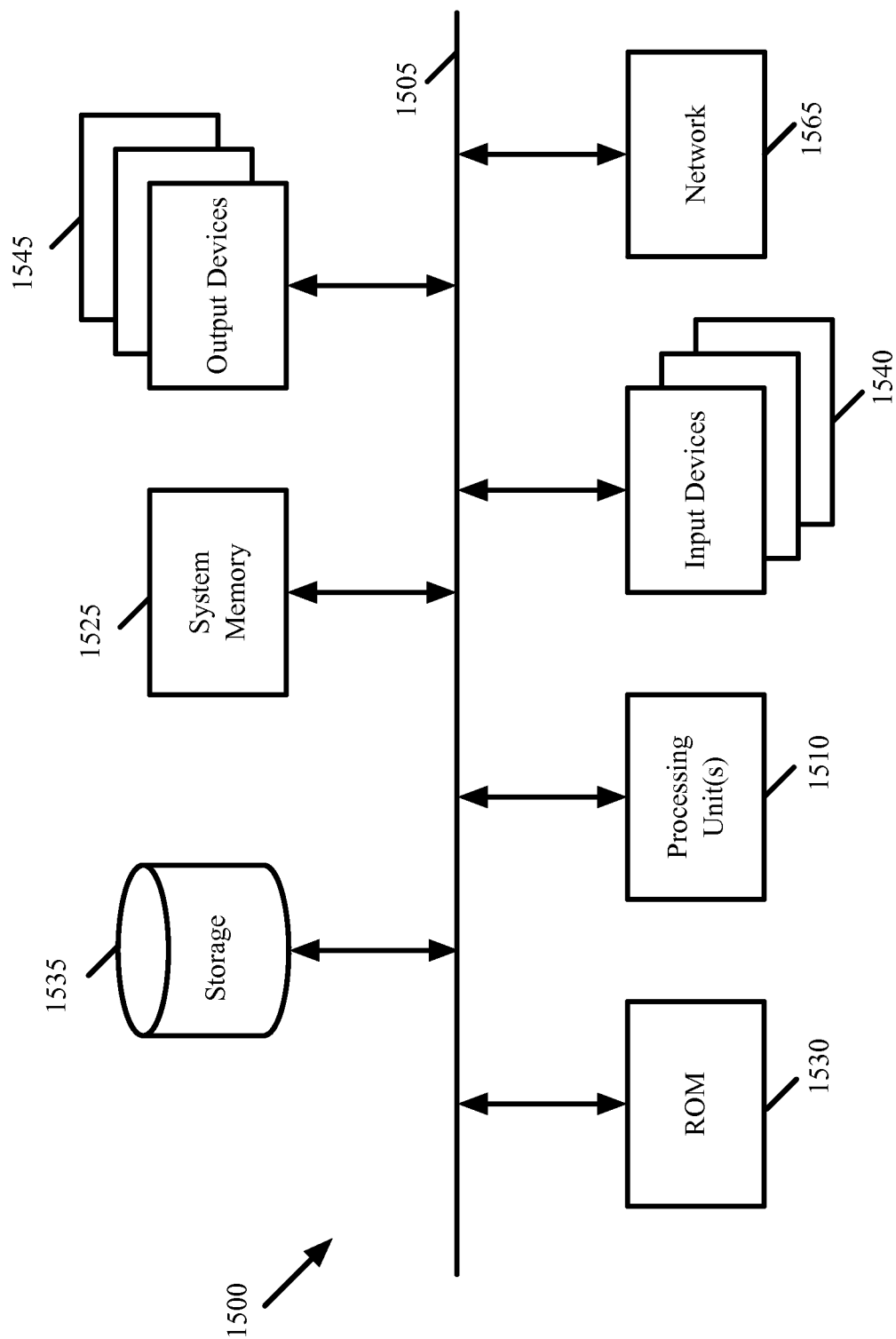
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 7, 9, 10, 12, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a plurality of logical networks, a method comprising:
   receiving a specification of a particular logical network of the plurality of logical networks that comprises at least one logical forwarding element that utilizes a DHCP service;
   selecting, from a plurality of host computers for hosting the DHCP service, a master host computer and a backup host computer for hosting the DHCP service;

generating a set of records that define the DHCP service; and distributing the generated set of records to the master and backup host computers in order to configure the master and backup host computers to process DHCP requests to provide the DHCP service, and to configure managed forwarding elements executing on the master and backup host computers to forward DHCP packets to the DHCP service.

2. The method of claim 1, wherein generating the set of records comprises generating a set of flow entries for managed forwarding elements operating in the master and backup host computers, the set of flow entries specifying for the managed forwarding elements to forward DHCP packets to the DHCP service; and distributing the generated set of records comprises distributing the generated flow entries to the master and backup host computers.

3. The method of claim 1, wherein selecting the master and backup host computers comprises evaluating usage of the plurality of host computers by other services for logical networks.

4. The method of claim 1, wherein the generated set of records comprises a record defining a virtualized container to reside on a master or backup host computer that receives the record, wherein the DHCP service operates as a process within the virtualized container.

5. The method of claim 4, wherein additional virtualized containers reside on the master and backup host computers, wherein additional DHCP services for other logical networks operate as processes on the additional virtualized containers.

6. The method of claim 5, wherein the master host computer is a backup host computer for another DHCP service.

7. The method of claim 4, wherein the record defining the virtualized container contains a flag enabling DHCP for the container.

8. The method of claim 1, wherein the master host computer executes a machine that performs an active implementation of the DHCP service and the backup host computer executes a machine that performs a standby implementation of the DHCP service.

9. The method of claim 1, wherein the at least one logical forwarding element comprises a logical switch, wherein a plurality of virtual machines that use the DHCP service are attached to the logical switch.

10. The method of claim 1, wherein the selecting is based on load balancing criteria that is defined to distribute DHCP services for the plurality of logical networks across a plurality of host computers.

11. A non-transitory machine readable medium storing a program for managing a plurality of logical networks, the program for execution by a set of hardware processing units of a computer, the program comprising sets of instructions for:

receiving a specification of a particular logical network of the plurality of logical networks that comprises at least one logical forwarding element that utilizes a DHCP service;

selecting, from a plurality of host computers for hosting the DHCP service, a master host computer and a backup host computer for hosting the DHCP service;

generating a set of records that define the DHCP service; and distributing the generated set of records to the master and backup host computers in order to configure the master and backup host computers to process DHCP requests to provide the DHCP service, and to configure managed forwarding elements executing on the master and backup host computers to forward DHCP packets to the DHCP service.

12. The non-transitory machine readable medium of claim 11, wherein the set of instructions for generating the set of records comprises a set of instructions for generating a set of flow entries for managed forwarding elements operating in the master and backup host computers, the set of flow entries specifying for the managed forwarding elements to forward DHCP packets to the DHCP service; and the set of instructions for distributing the set of records comprises a set of instructions for distributing the generated flow entries to the master and backup host computers.

13. The non-transitory machine readable medium of claim 11, wherein the set of instructions for selecting the master and backup host computers comprises a set of instructions for evaluating usage of the plurality of host computers by other services for logical networks.

14. The non-transitory machine readable medium of claim 11, wherein the generated set of records comprises a record defining a virtualized container to reside on a master or backup host computer that receives the record, wherein the DHCP service operates as a process within the virtualized container.

15. The non-transitory machine readable medium of claim 14, wherein additional virtualized containers reside on the master and backup host computers, wherein additional DHCP services for other logical networks operate as processes on the additional virtualized containers.

16. The non-transitory machine readable medium of claim 15, wherein the master host computer is a backup host computer for another DHCP service.

17. The non-transitory machine readable medium of claim 14, wherein the record defining the virtualized container contains a flag enabling DHCP for the container.

18. The non-transitory machine readable medium of claim 11, wherein the master host computer executes a machine that performs an active implementation of the DHCP service and the backup host computer executes a machine that performs a standby implementation of the DHCP service.

19. The non-transitory machine readable medium of claim 11, wherein the at least one logical forwarding element comprises a logical switch, wherein a plurality of virtual machines that use the DHCP service are attached to the logical switch.

20. The non-transitory machine readable medium of claim 11, wherein the set of instructions for selecting comprises a set of instructions performing the selection based on load balancing criteria that is defined to distribute DHCP services for the plurality of logical networks across a plurality of host computers.

21. The non-transitory machine readable medium of claim 11, wherein on the master computer, the DHCP service operates in a namespace hosted on the master computer.

* * * * *